United States Patent [19]

Shirai et al.

[11] Patent Number: 5,111,369
[45] Date of Patent: May 5, 1992

[54] HEADLIGHT FOR MOTOR VEHICLE

[75] Inventors: Katutada Shirai; Hideharu Mochizuki, both of Shizuoka, Japan

[73] Assignee: Koito Manufacturing Co., Ltd., Tokyo, Japan

[21] Appl. No.: 741,902

[22] Filed: Aug. 8, 1991

Related U.S. Application Data

[62] Division of Ser. No. 624,868, Dec. 10, 1990.

[30] Foreign Application Priority Data

Dec. 27, 1989 [JP] Japan ................... 1-336265
Dec. 28, 1989 [JP] Japan ................... 1-338385
Dec. 28, 1989 [JP] Japan ................... 1-338386
Mar. 29, 1990 [JP] Japan ................... 2-78630

[51] Int. Cl.$^5$ .............................................. F21M 3/20
[52] U.S. Cl. .................................... 362/61; 362/226; 362/66; 362/101; 33/335; 33/379
[58] Field of Search ............... 362/61, 66, 80, 101, 362/226, 287, 289, 418; 33/335, 365, 370, 376, 379

[56] References Cited

U.S. PATENT DOCUMENTS

| 1,609,634 | 12/1926 | Ryan | 33/370 |
|---|---|---|---|
| 3,835,549 | 9/1974 | DeJong et al. | 33/379 |
| 4,660,128 | 4/1987 | Bergin et al. | 362/80 |
| 4,794,495 | 12/1988 | McMahan et al. | 362/66 |
| 4,922,387 | 5/1990 | Ryder et al. | 362/80 |
| 5,031,081 | 7/1991 | Daumueller | 362/66 |
| 5,032,964 | 7/1991 | Endo et al. | 362/61 |
| 5,063,480 | 11/1991 | McMahan et al. | 362/66 |

Primary Examiner—Ira S. Lazarus
Assistant Examiner—Y. Quach
Attorney, Agent, or Firm—Sughrue, Mion, Zinn, Macpeak & Seas

[57] ABSTRACT

A headlight for a motor vehicle having a level for adjusting the direction of light emission from the headlight in the vertical direction in which the quantities of heat transmitted to the respective regions of the casing of the level which face the bubble vial of the level are made substantially equal to each other, even if the temperature around the level changes due to the lighting or extinction of the bulb of the headlight or the like, so that the accuracy of the measurement performed with the level is maintained despite changes in the temperature around the level.

8 Claims, 16 Drawing Sheets

HEADLIGHT FOR MOTOR VEHICLE

BACKGROUND OF THE INVENTION

The present invention relates to a headlight for a motor vehicle having a level for judging whether the angle of the elevational direction of emission of light from the headlight is proper or not If the angle is judged not to be proper, the headlight can be easily adjusted to make the angle proper.

In a headlight of a type described in U.S. Pat. Nos. 4,794,495 and 4,802,067, a bubble vial type level is attached to a headlight body and reflector unit in which a reflector is integrally formed on the inside curved surface of the body of the headlight. The level extends horizontally in parallel with the optical axis of the headlight. The angle of the direction of emission of light from the headlight can be adjusted by an aiming mechanism while and the graduations of the level, at which an air bubble is located, are observed There is no problem when the adjustment is performed by observing the graduations of the level while the bulb of the headlight is not lit. However, there is a problem that the position of the air bubble may not accurately indicate the angle of the vertical swing of the level in performing the adjustment while the bulb is lit.

That is, the level of the headlight is attached to a headlight body and reflector unit made of a synthetic resin of low thermal conductivity. The bubble vial and level casing are generally also made of a synthetic resin of low thermal conductivity. Thus, the quantity of heat transmitted from the lit bulb to portions of the bubble vial near the bulb differs from that of heat transmitted from the lit bulb to other portions of the vial farther from the bulb. For this reason, the air bubble of the level is displaced from a proper position which indicates the angle of the vertical swing of the bubble vial.

The present inventors conducted studies and experiments on a level as shown in FIG. 1. As a result, they found out that the reason why the air bubble of the level is displaced from its proper position is that the quantity of heat transmitted from the casing 302 of the level to the bubble vial 304 thereof differs from region to region in the longitudinal direction (the horizontal direction in FIG. 1) of the casing to create a temperature difference in the liquid contained in the vial to cause convection from a region of lower temperature to a region of higher temperature in the vial. The difference in the quantity of the heat results from the fact that a reflector 300 and the casing 302 are made of a synthetic resin which is so low in thermal conductivity that the heat is not uniformly transmitted from a bulb 306 to the whole level. The heat transmitted from the bulb 306 through the reflector 300 to the front end portion 302a of the casing 302, which is nearer the bulb, is accumulated, making the temperature of the portion as high as about 79° C., because the reflector and the casing are low in thermal conductivity. The heat is not well transmitted from the bulb 306 through the reflector 300 to the rear end portion 302b of the casing 302, which is farther from the bulb, so that the temperature of that portion is lower (at about 70° C.) than that of the front end portion 302a of the casing, because the reflector and the casing are low in thermal conductivity and the heat transmission passage from the bulb to the rear end portion is longer than that from the bulb to the front end portion.

A temperature difference of about 9° C. thus occurs between the front and rear end portions 302a and 302b of the casing 302, so that a temperature difference of about 8° C., nearly equal to the former, is developed between the front and rear end portions of the bubble vial 304. Convection is caused in the vial 304 due to this temperature difference, as a result of which the air bubble 305 is displaced from its proper position. The maximum displacement of the air bubble 305 corresponded to a swing angle of 0.38 degree in the inventors' experiments.

Accordingly, it was determined that if the thermal conductivity of the casing 302 of the level is increased, the quantity of the heat transmitted from the bulb 306 to the region of the casing 302 farther from the bulb is nearly equalized to the amount of the heat transmitted from the bulb to the other regions of the casing nearer the bulb, so that the quantities of the heat transmitted to the respective regions of the bubble vial 304 through the casing are nearly equalized to each other, namely, the difference between the temperatures of the regions of the vial is reduced. The present invention is based on this determination.

SUMMARY OF THE INVENTION

Accordingly, it is an object of the present invention to provide a headlight for a motor vehicle having a level in which the quantities of heat transmitted to the respective regions of the casing of the level which face the bubble vial of the level are nearly equalized to each other, even if the temperature around the level changes due to the lighting or extinction of the bulb of the headlight or the like, so that the accuracy of the measurement performed with the level is maintained despite changes in the temperature around the level.

In a headlight for a motor vehicle in accordance with the present invention of the aiming device moving type, an aiming device can be aimed vertically and horizontally relative to a reference member so as to adjust the angle of the direction of emission of light from the headlight. In such a case, the level for measuring the angle of the elevational direction of emission of light from the headlight is attached in a prescribed position relative to the aiming device, and includes a casing made of a high-thermal-conductivity material such as metal, and a bubble vial housed in the casing. The bubble vial may be supported at the inside of the lid of the level, and a heat insulating air layer formed between the vial and the casing. The casing may be separated from the body of the aiming device by bearing parts integrally formed on the body thereof and projecting therefrom. The headlight may be of the movable reflector type in which the reference member is the body of the headlight and the aiming device is a reflector swingable in the body. Also, the headlight may be of the movable unit type in which the reference member is a headlight housing and the aiming device is a headlight body and reflector unit in which a reflector is integrally formed on the inside curved surface of the body of the headlight.

When the bulb of the headlight provided in accordance with the present invention is lit, heat is transmitted from the bulb to the respective regions of the level through the aiming device in such a manner that the quantities of heat transferred to the various regions are in inverse proportion to the lengths of the heat transmission passages from the bulb to the regions. However, since the casing of the level is high in thermal conductivity, the quantity of heat eventually transmitted from the bulb to the portion of the casing nearer the bulb is nearly equalized to that of the heat eventually transmitted from the bulb to the other portions of the casing farther from the bulb. Thus, the difference between the quantities of heat eventually transmitted from the bulb to the respective regions of the casing is reduced so that the quantities of heat transmitted to the respective regions of the bubble vial are nearly equalized to each other. This results in restricting convection in the liquid contained in the vial.

In the case where the bubble vial is supported at the inside of the lid of the level and a heat insulating air layer is formed between the vial and the casing, eventually equal quantities of heat are transmitted to the respective regions of the casing in advance due to the restriction of heat transmission by the heat insulating air layer, and the quantities of the heat transmitted from the casing to the bubble vial through the layer are nearly equalized to each other by the layer.

In the case where the casing of the level is separated from the body of the aiming device by bearing parts formed on the body and projecting therefrom, the heat transmission passages from the aiming device to the casing of the level are confined to the bearing parts projecting from the body of the aiming device, thus reducing the quantity of heat transmitted from the aiming device, and reducing the quantity of heat transmitted from the aiming device to the level.

In a headlight which is provided for a motor vehicle in accordance with the present invention to solve the above problems and which is of the movable reflector type, a reflector fitted with a bulb therein can be swung vertically and horizontally in the body of the headlight so as to adjust the angle of the direction of emission of light from the headlight. A level for measuring the angle of the elevational direction of the emission of the light from the headlight is attached in a prescribed position to the upper portion of the reflector. The level includes a casing shaped as a rectangular container and open at the top of the casing, and a rectilinear air bubble vial which is hung with an air bubble tube holder provided at the open top of the casing and is housed in the casing. A first zero point adjustment mechanism is provided in such a manner that one longitudinal end portion of the holder in the longitudinal direction of the vial is fitted in the casing by a hook and opening engagement means so as to vertically support the holder, the other end portion of the holder in the longitudinal direction is fitted to a first vertical screw engaged in the tapped hole of the casing and vertically extending through the holder so as to be used for the zero point adjustment of the level, a compressed spring is provided between the holder and the casing and urges the holder toward the head of the screw so as to elastically support the holder, and the holder can be swung about the hook and opening engagement means by turning the screw. A second zero point adjustment mechanism is provided between the screw and the opening engagement means and composed of a second vertical screw engaged in the other tapped hole of the casing and vertically extending through the holder, and a second compressed spring provided between the holder and the casing and elastically supporting the holder. The portion of the body of the headlight which corresponds to the level has an opening into which a tool for turning the vertical screws can be inserted at the time of the zero point adjustment. A transparent cap for forming an observation window for reading graduations is removably fitted in the opening.

The angle of the vertical swing of the reflector of the headlight provided in accordance with the present invention is indicated by the graduations of the air bubble vial of the level so as to judge whether the angle of the elevational direction of the emission of the light from the headlight is proper or not. If the angle is judged not to be proper, the reflector is swung to adjust the angle to be proper.

The first vertical screw or/and second vertical screw of the level can be turned to swing the air bubble tube holder about the swing fulcrum therefor to change the angle of the posture of the bubble vial relative to a horizontal plane to adjust the position of the air bubble of the level to that of the graduation thereof, namely, perform the zero point adjustment of the level.

The headlight for a motor vehicle of an aiming device moving type has been disclosed in commonly assigned U.S. patent application, Ser. No. 07/508,751, filed on Apr. 12, 1990, which however does not disclose the casing made of a metal.

DESCRIPTION OF THE PREFERRED EMBODIMENTS

Preferred embodiments of the present invention are hereafter described in detail with reference to the attached drawings.

Figure 1:
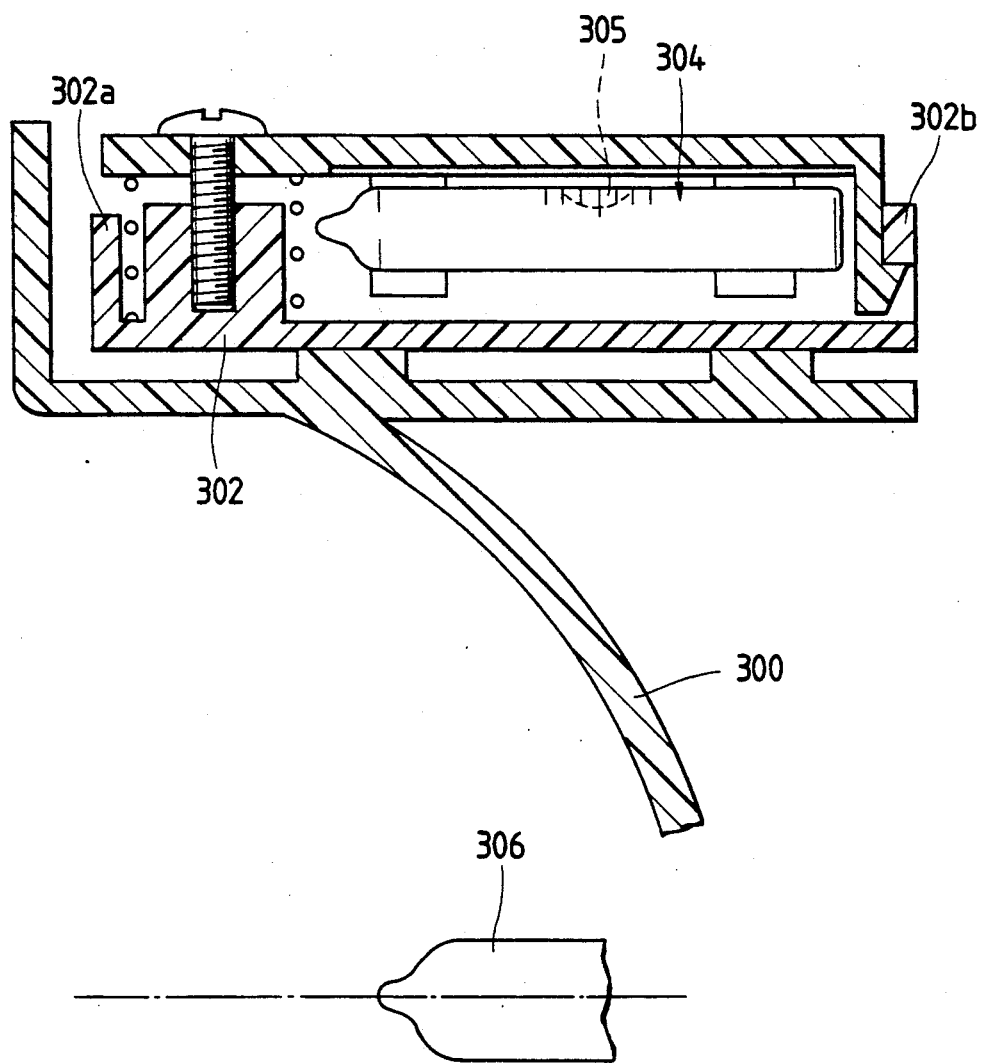
FIG. 1 is a vertical sectional view of the level section of a headlight used to study the length of movement of an air bubble.
Figure 2:
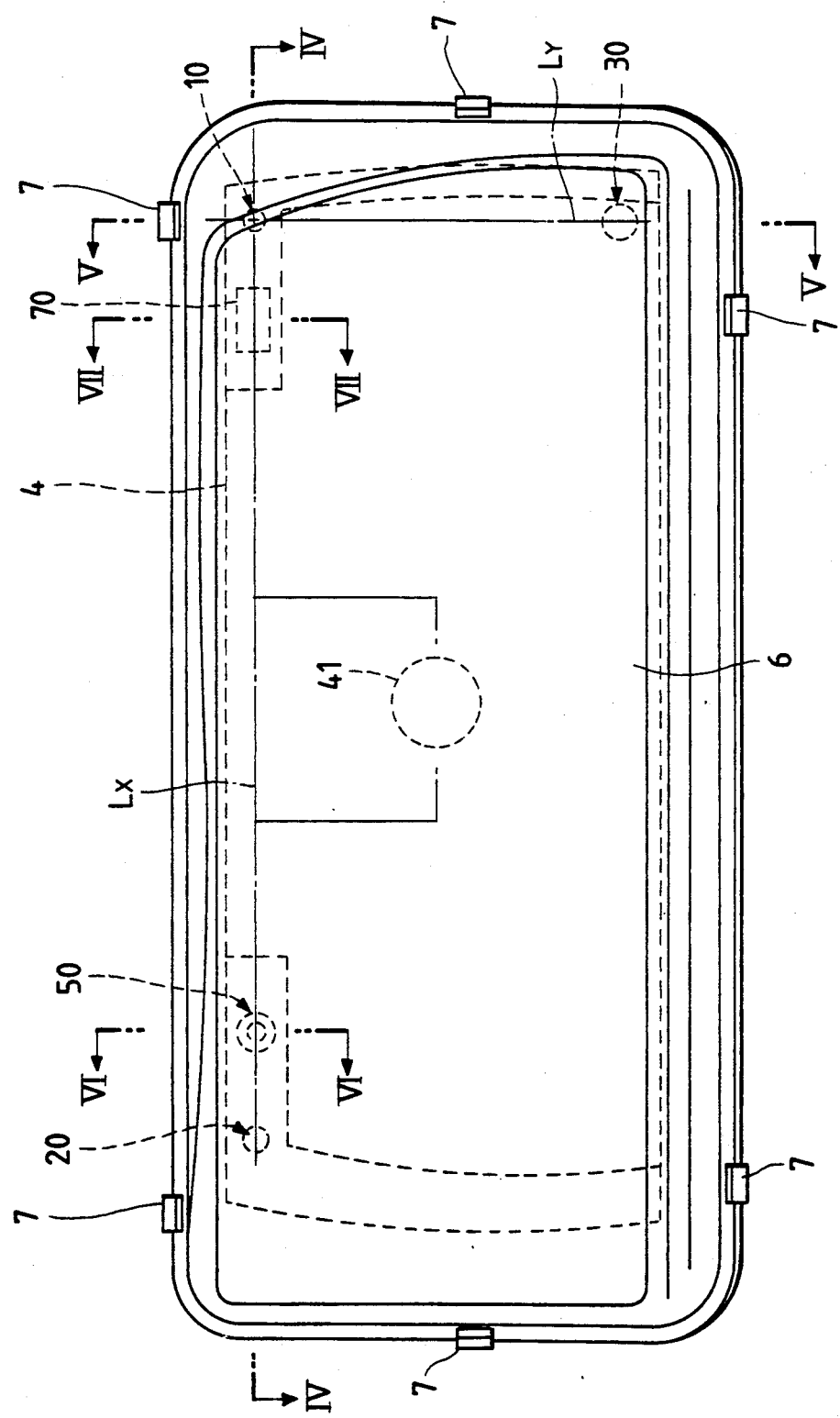
FIG. 2 is a front view of a headlight of the movable reflector type constructed in accordance with a preferred embodiment of the present invention.
Figure 3:
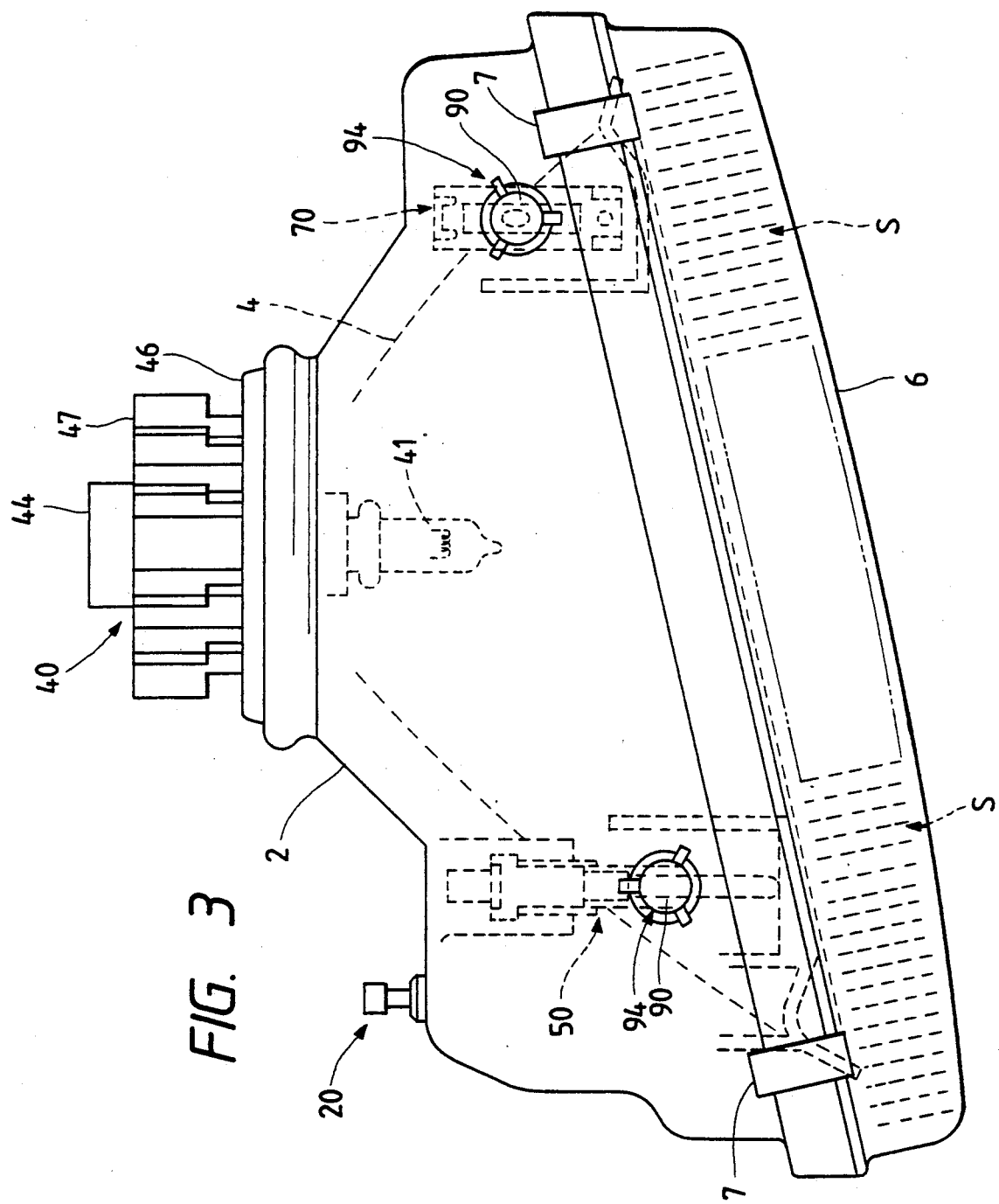
FIG. 3 is a plan view of the headlight of FIG. 2.
Figure 4:
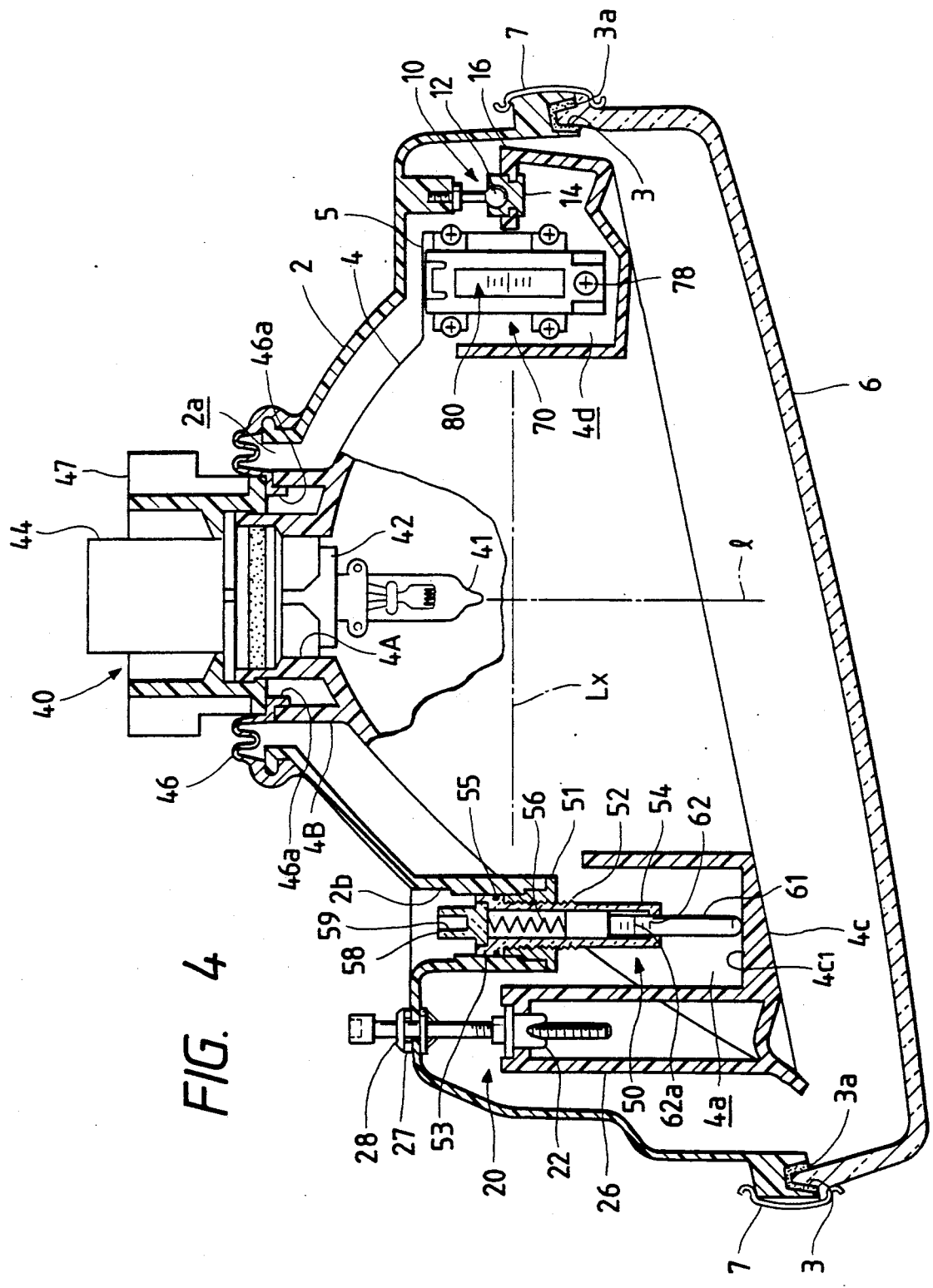
FIG. 4 is a horizontal sectional cutaway view of the headlight.
Figure 5:
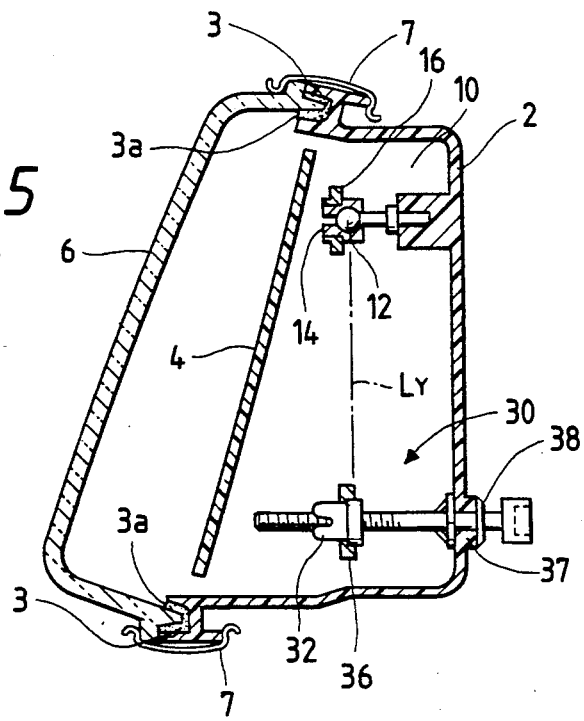
FIG. 5 is a vertical sectional view of the headlight along a line V—V shown in FIG. 2.
Figure 6:
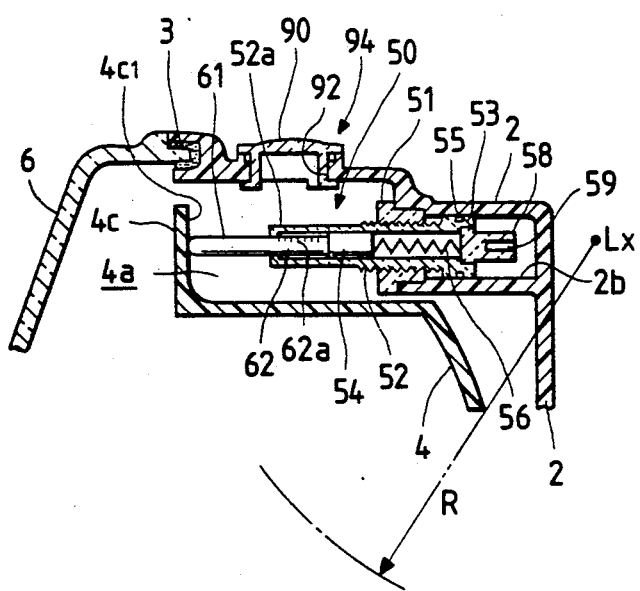
FIG. 6 is a vertical sectional view (along a line VI—VI shown in FIG. 2) of a first aiming device section of the headlight.
Figure 7:
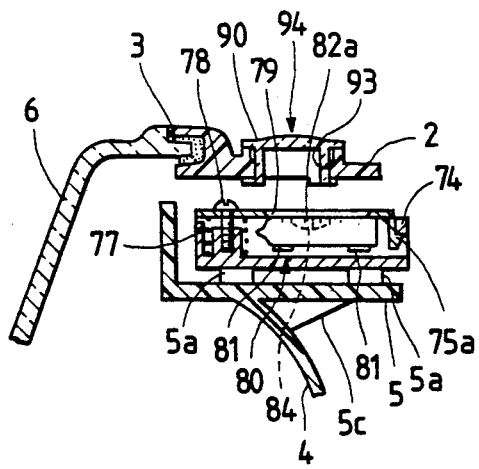
FIG. 7 is a vertical sectional view (along a line VII—VII shown in FIG. 2) of a second aiming device (level) section of the headlight.
Figure 8:
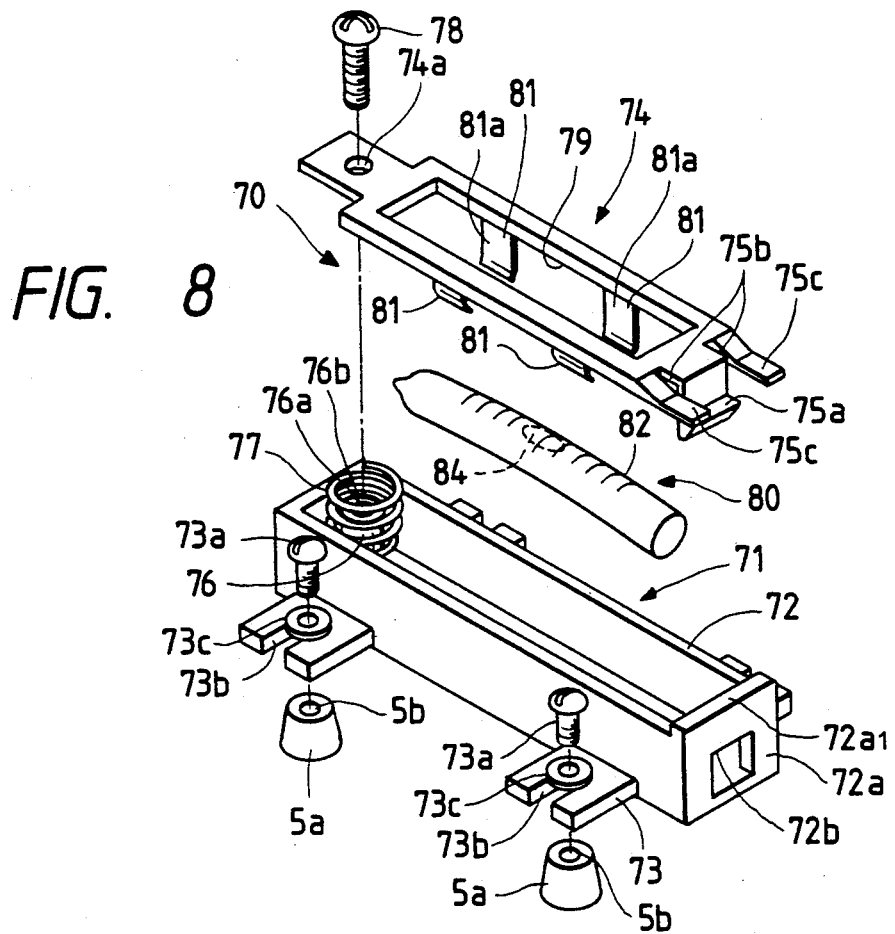
FIG. 8 is a perspective exploded view of the level which is the second aiming device of the headlight.
Figure 9:
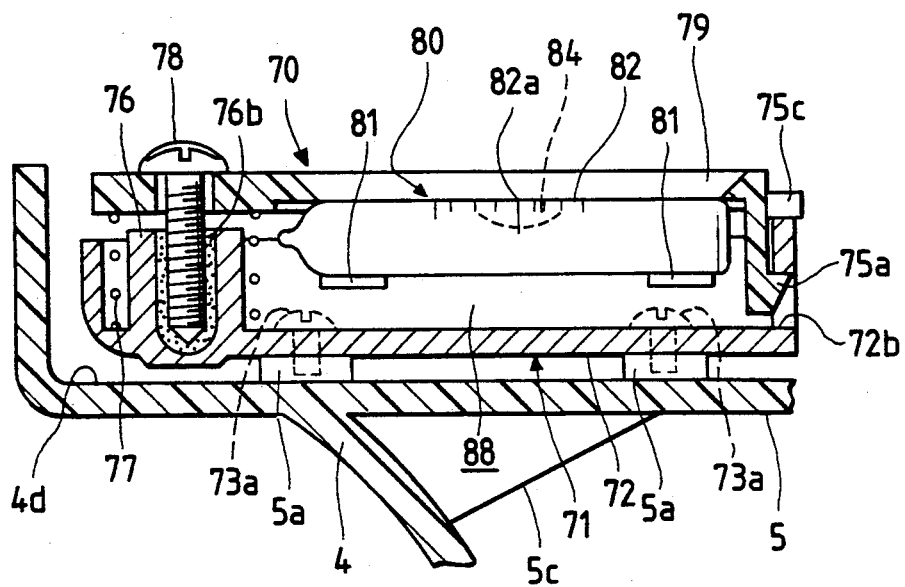
FIG. 9 is an enlarged vertical sectional view of the level.

FIGS. 1-8 show a headlight for a motor vehicle of a first embodiment. The headlight is of the movable reflector type in which the body of the headlight is a reference member and the reflector of the headlight is an aiming device. FIG. 2 is a front view of the headlight having a light emission angle adjuster. FIG. 3 is a plan view of the headlight FIG. 4 is a horizontal sectional cutaway view of the headlight. FIG. 5 is a vertical sectional view of the headlight along a line V—V shown in FIG. 2. FIG. 6 is a vertical sectional view (along a line VI—VI shown in FIG. 2) of the measuring device section of the headlight, in which a measuring device for measuring the angle of the azimuthal direction of emission of light from the headlight is provided. FIG. 7 is a vertical sectional view (along a line VII—VII shown in FIG. 2) of the level section of the headlight, in which a level which is a measuring device for measuring the angle of the elevational direction of emission of light from the headlight is provided. FIG. 8 is a perspective exploded view of the level. FIG. 9 is an enlarged vertical sectional view of the level. The headlight includes a headlight body 2 shaped as a container, a reflector 4 provided in the body, and a front lens 6 fitted on the rectangular front opening of the body. The body 2, the reflector 4 and the front lens 6 are joined to each other to constitute the headlight.

As shown in FIGS. 1, 3 and 4, the reflector 4 is supported at three points by a ball joint 10 and adjusting screws 20 and 30. The ball joint 10 is supported at the ball 12 thereof on the reflector 4 so that the reflector can be swung about the ball joint. The adjusting screws 20 and 30 are rotatably supported by the headlight body 2 and engaged in nuts 22 and 32 at the reflector 4 so that the adjusting screws can be turned to move the nuts backward and forward on the screws to change the angle of the swing of the reflector 4. A socket 14 for supporting the ball 12 of the ball joint 10 is secured to a bracket 16 secured to the back of the reflector 4. The nuts 22 and 32, which are engaged with the adjusting screws 20 and 30, are supported by brackets 26 and 36 secured to the back of the reflector 4. O-rings 27 and 37 and flanges 28 and 38 projecting from the adjusting screws 20 and 30 are further provided. The point of the reflector 4 at which the reflector is supported by the adjusting screw 20 and the screw is engaged in the nut 22 is on a horizontal axis $L_x$ rectangularly crossing with the optical axis 1 of the bulb 41 of the headlight and extending through the ball joint 10. The point of the reflector 4 at which the reflector is supported by the other adjusting screw 30 and the screw is engaged in the nut 32 is on a vertical axis $L_Y$ rectangularly crossing with the optical axis 1 and extending through the ball joint 10. As a result, the reflector 4 can be swung about the vertical axis $L_Y$ by turning the adjusting screw 20 to adjust the angle of the horizontal swing of the reflector, namely, adjust the angle of the azimuthal direction of the emission of light from the headlight, and the reflector can be swung about the horizontal axis $L_x$ perpendicularly intersecting the vertical axis by turning the other adjusting screw 30 to adjust the angle of the vertical swing of the reflector, namely, adjust the angle of the elevational direction of the emission of light from the headlight. The angle of the swing of the reflector 4, namely, the angle of the direction of emission of light from the headlight, can thus be adjusted by turning the two adjusting screws 20 and 30.

Shown at 40 in FIG. 4 is a bulb socket integrally coupled with the bulb 41. The rear portion of the headlight body 2 has an opening 2a for attaching and detaching the bulb socket 40. The socket 40 is fitted into the socket hole 4A of the rear portion of the reflector 4 through the opening 2a of the rear portion of the headlight body 2. A rubber cover 46 is attached to the outside circumferential surface of the rear portion of the reflector 4 and closes the gap between the reflector and the headlight body 2. A locking cap 47 is provided on the outside circumferential surface of the bulb socket 40 and pushes the socket and the rubber cover 46 so that the socket is secured in the socket hole 4A of the headlight body 2 and the inner circumferential edge 46a of the rubber cover is kept in D tight contact with the circumferential part 4B of the reflector 4. The bulb 41 is fitted in a metal base 42. Electric connection terminals are provided in a cylindrical connector 44.

Shown at 3 in FIGS. 1, 2, 3 and 4 is a sealing groove provided in the peripheral portion of the headlight body 2, which groove is filled with a sealant 3a and fitted with the peripheral portion of the front lens 6. A clip 7 for mechanically clamping the front lens 6 and the headlight 2 to each other is provided.

Shown at 50 in FIGS. 1, 2, 3 and 6 is the first aiming device, which is mounted in a horizontal plane containing the horizontal axis $L_x$ and is used for measuring the angle of the horizontal swing of the reflector 4, namely, the angle of the azimuthal direction of emission of light from the headlight. The headlight body 2 has a cylindrical projecting portion 2b integrally formed thereon and projecting into the recess 4a of the upper right-hand portion of the reflector 4. The first aiming device 50 is fitted in the cylindrical projecting portion 2b of the body 2, and extends in parallel with the optical axis 1 of the bulb 41. The device 50 includes a cylindrical support member 52, a rod 54 inserted in the member 52, and a compressed helical spring 56 provided in the member 52 and urging the rod forward 54. A female-threaded member 51 is secured to the tip of the projecting portion 2b of the headlight body 2. The male-threaded portion of the support member 52, which is made of a transparent synthetic resin, is engaged in the female-threaded member 51. The support member 52 has an increased-diameter portion 53 at the rear end of the member. An O-ring 55 is fitted on the outside circumferential surface of the increased-diameter portion 53, and seals the surface of the projecting portion 2b on which the increased-diameter portion slides. A cap 58 having screwdriver engagement portion 59 is fuse-bonded to the increased-diameter portion 53 so that the support member 52 can be turned relative to the female-threaded member 51 by a screwdriver (not shown in the drawings) to move the support member backward and forward in the axial direction thereof relative to the headlight body 2. The rod 54 is a stepped rod whose small-diameter portion is protruded forward by the urging force of the compressed helical spring 56 so that the portion is kept in contact with the back of the vertical portion 4c of the reflector 4. A reference line 52a is provided on the outside circumferential surface of the tip portion of the transparent support member 52, and rectilinear graduations 62 are provide on the small-diameter portion 61 of the rod 54 and juxtaposed with each other in the axial direction thereof, as shown in FIG. 6. When the reflector 4 is swung about the vertical axis $L_Y$, the rod 54 is moved backward or forward in the axial direction thereof by a length corresponding to the angle of the swing and graduations 62 are moved relative to the reference line 52a. The surface $4c_1$ of the vertical portion 4c of the reflector 4, with which the small-diameter portion of the rod 54 is in contact, is a curved surface, the radius of curvature of which is R and the center of curvature of which is on the horizontal axis $L_x$, as shown in FIG. 6, so that the graduations of the measuring device 50 are not moved by the vertical swinging movement of the reflector 4 about the horizontal axis $L_x$. A zero-point graduation 62a, which is one of the graduations of the measuring device 50 are not moved by the vertical swinging movement of the reflector 4 about the horizontal axis $L_x$. A zero-point graduation 62a, which is one of the graduations 62, is coincident with the reference line 52a when the angle of the horizontal swing of the reflector 4 is proper. As a result, the graduation 62 whose position is coincident with that of the reference line 52a indicates the angle of the horizontal swing of the reflector 4. The portion of the headlight body 2 which corresponds to the reference line 52a at which the graduation 62 of the first aiming device 50 is read has an observation window 90 through which the graduations can be observed. The observation window 90 is formed by the opening 92 of the body 2 and a transparent convex lens cap 94 fitted in the opening so that the magnified image of the graduations of the device 50 can be seen through the cap.

Shown at 70 in FIGS. 1, 2, 3, 6, 7 and 8 is the second aiming device, which is the level for measuring the angle of the vertical swing of the reflector 4, namely, the angle of the elevational direction of emission of light from the headlight. The level 70 is provided in the recess 4d of the upper lefthand portion of the reflector 4. The level 70 is composed of a level casing 71 and an bubble vial 80 housed in the casing. The level is secured to the upper portion of the reflector 4 by four screws 73a. The casing 71 is made of die-cast aluminum of high thermal conductivity, and includes a body 72 shaped as a rectangular container open at the top thereof, and four tongues 73 extending sideward from the body. The body 72 is large enough in size to contain the bubble vial 80. The tongues 73 have engagement portions 73b engaged with the screws 73a. The upper portion of the reflector 4 has a part 5 extending in the front-to-rear direction of the headlight and is formed with four bosses 5a on which the level 70 is borne. The bosses 5a have holes 5b into which the screws 73a are inserted to secure the tongues 73 of the level 70 to the bosses. Annular rubber spacers 73c are fitted on the engagement portions 73b of the tongues 73 so that the ferrous screws 73a are kept out of contact with the aluminum tongues 73 to prevent the tongues from undergoing electrolytic corrosion. Shown at 5c in FIGS. 6 and 8 is a web for reinforcing the outwardly extending part 5. The tongues 73 are thus borne on the bosses 5a so that the level casing 71 is located over the part 5 out of contact therewith except the bosses. For this reason, heat generated by the lit bulb 41 is less likely to be transmitted to the level casing 71 through the reflector 4, thus restricting the rise in the temperature of the bubble vial 80.

In order to reduce the number of the screws 73a and simplify the work of attaching the level 70 to the reflector 4, the level may be attached with only two screws located in mutually diagonal positions. A lid 74, which is made of a high-elasticity synthetic region such as U polymer and polyacetal and fitted with the bubble vial 80 at the inside of the lid, is secured to the top of the casing body 72 by hook and opening engagement and the engagement of an adjusting screw 78. The rear wall 72a of the casing body 72 has a rectangular opening 72b. The lid 74 has a hook 75a at the rear end of the lid. The hook 75a extends down from the body of the lid 74 and is fitted in the opening 72b of the casing body 72. The lid 74 has a pair of slits 75b and a pair of engagement portions 75c at both the sides of the hook 75a so that the slit is located between the hook and the engagement portion. When the hook 75a is fitted in the opening 72b of the casing body 72 as the engagement portions 75c are in contact with the top $72a_1$ of the rear wall of the casing body, the hook and the engagement portions 75c are elastically deformed in mutually opposite directions as cantilevers so that the rear end portion of the lid 74 is prevented from vertically coming off the casing body and is elastically supported vertically, as shown in FIG. 9. A hook and opening elastic engagement means for preventing the rear end portion of the lid 74 from being disengaging from the casing body 72 and for elastically supporting the lid is thus made of the opening 72b, the hook 75a and the engagement portion 75c at the rear end of the lid, and the rear wall 72a of the casing body.

The lid 74 has a screw insertion hole 74a at the front end of the lid. The casing body 72 has a boss 76 on the bottom of the inside of the front portion of the body. The boss 76 has a tapped hole 76a. A compressed helical spring 77 is provided around the boss 76. The front end portion of the lid 74 and the boss 76 are coupled to each other by the adjusting screw 78 so that the lid is elastically supported at the front end portion thereof vertically to the casing body 72. Shown at 76b in FIGS. 7 and 8 is a rubber liner on the inside circumferential surface of the boss 76 in the tapped hole 76a. The rubber liner 76b is used to keep the ferrous adjusting screw 78 and the boss made of aluminum out of contact with the each other to prevent the boss from undergoing electrolytic corrosion. The inclination of the lid 74 and the bubble vial 80 or the position of the air bubble 84 in the vial can be adjusted by rotating the adjusting screw 78. The bubble vial 80 is attached to the inside of the lid 74 by pinchers 81 so that the surface of the vial, which has graduations 82, is exposed in the rectangular opening 79 of the central portion of the lid. Shown at 82a in FIG. 9 is a zero-point graduation which is one of the graduations 82. The pinchers 81 are spring-like portions integrally formed on the lid 74 so that the bubble vial 80 is pinch-held on the outside circumferential surface thereof by the curved surfaces 81a of the pinchers. Since the bubble vial 80 is hung with the pinchers 81 from the body of the lid 74, a heat insulating air layer 88 is formed between the casing body 72 and the vial so that the transmission of heat from the casing body to the vial is restricted. The vial 80 can be easily attached to the lid 74 by the one-shot operation of inserting the vial between the pinchers 81 from the lower edge thereof.

When the bulb 41 is lit as the level 70 remains attached to the outwardly extending part of the reflector 4, the heat generated by the bulb is transmitted to the casing 71 of the level through the body, part 5 and bosses 5a of the reflector of low thermal conductivity and then to the bubble vial 80. The quantities of heat transmitted to the respective regions of the body 72 of the casing 71 are in inverse proportion to the lengths of the heat transmission passages to the regions and differ from each other. However, since the casing body 72 is made of aluminum of high thermal conductivity, the difference between the quantities of the heat transmitted to the regions of the casing body through the body, outwardly extending part 6 and bosses 5a of the reflector 4, and the casing body itself is reduced by the casing body so that the difference between the quantities of heating of the regions is decreased. Since the bubble vial 80 is hung with the pinchers 81 in the casing body 72 so that the heat insulating air layer 88 is formed between the vial and the casing body, the transmission of heat from the casing body to the vial is restricted by the heat insulating air layer, and the difference between the quantities of the heat transmitted from the casing body to the vial through the layer is reduced by the layer. In other words, the distribution of the quantities of the heat transmitted to the respective regions of the bubble vial 80 is made uniform in the longitudinal direction thereof so that the difference between the temperature of the front end portion of the vial and that of the rear end portion thereof is small. Thus, convection is not caused in the vial 80 by the temperature difference, as occurred in the earlier arrangement, so that the air bubble 84 is hardly displaced.

The attachment of the level 70 to the reflector 4 will now be described with reference to FIG. 8.

The bubble vial 80 is first held by the pinchers 81 so that the vial is attached to the lid 74. The rear end portion of the lid 74 is fitted in the rear wall 72a of the casing body 72 by the hook and opening engagement, and the front end portion of the lid is coupled to the boss 76 of the casing body by the adjusting screw 78, so that the lid, the vial 80 and the casing body are assembled to constitute the level 70. The tongues 73 of the casing 71 are positioned to the bosses 5a of the reflector 4 and then secured to the bosses by the screws 73a. After the level 70 is thus attached to the upper portion of the reflector 4, the level is adjusted by the adjusting screw 78 so that the position of the air bubble 84 of the level is coincident with that of the zero-point graduation 82a thereof when the angle of the vertical swing of the reflector, namely, the angle of the elevational direction of emission of light from the headlight, is proper. As shown in FIG. 7, the portion of the headlight body 2 which corresponds to the level 70 has an opening 93 defining an observation window 90 for reading the graduations 82 of the level. The angle of the elevational direction of emission of light from the headlight, which is indicated by the level 70, can be read through the observation window 90.

A procedure of adjusting the aiming devices 50 and 70 after attaching the headlight to the body of the motor vehicle, and a procedure of adjusting the angle of the direction of emission of light from the headlight after the adjustment of the measuring devices will now be described.

The headlight is designed such that the angle of the azimuthal direction of emission of light from the headlight before the headlight attached to the body of the vehicle is proper when the position of the zero-point graduation 62a on the rod 54 of the first aiming device 50 is coincident with that of the reference line 52a thereof, and the angle of the o elevational direction of emission of light from the headlight prior to attachment to the body of the vehicle is proper when the position of the air bubble 84 of the level 70, which is the second aiming device, is coincident with that of the zero-point graduation 82a, which is one of the graduations 82 of the level. When the headlight having the first and the second aiming device 50 and 70 is attached to the body of the vehicle, the graduations of the device usually are not initially in their proper positions due to various dimensional inaccuracies or the like. The graduations of the devices then need to be adjusted to the proper positions.

An example of a process of adjusting the graduations of the first aiming device 50 to the proper positions will now be described.

The motor vehicle is moved onto a horizontally level surface. A light reception screen is placed in a prescribed position in front of the vehicle. The headlight is lit. The adjusting screw 20 is turned to set the spot of the light from the headlight at a prescribed position on the screen in the horizontal direction thereof, i.e., the optical axis ; of the headlight is made coincident with the axis of the vehicle.

At that time, the position of the reference line 52a and that of the zero-point graduation 62a usually do not coincide with each other due to dimensional inaccuracies of the headlight attachment surface of the body of the vehicle or the like. In that case, the support member 52 is turned by a screwdriver so as to be moved backward or forward in the axial direction of the member to make the position of the zero-point graduation 62a of the device 50 coincident with that of the reference line 52a thereof. The device 50 is thus adjusted so that the graduation 62a whose position is coincident with that of the reference line 52a indicates the zero point of the device when the angle of the azimuthal direction of emission of light from the headlight is proper.

An example of a process of adjusting the graduations of the second aiming device 70 to the proper positions will now be described.

The adjusting screw 30 is turned so that the spot of light from the headlight is set at a prescribed position on the screen in the vertical direction thereof. At that time, the position of the air bubble 84 usually does not coincide with that of the zero-point graduation 82a due to dimensional inaccuracies of the headlight attachment surface of the body of the vehicle or the like. In that case, the adjusting screw 78 of the device 70 is turned so that the position of the air bubble 84 coincides with that of the zero-point graduation 82a. The device 70 is thus adjusted so that the air bubble 84 indicates the zero-point graduation 82a when the angle of the elevational direction of emission of light from the headlight is proper.

After that, the user of the headlight adjusts the angle of the direction of emission of light therefrom if necessary. When it is observed by looking downward from over the front lens 6 that the position of the reference line 52a of the first aiming device 50 is not coincident with that of the zero-point graduation 62a thereof, or the position of the air bubble 84 of the second aiming device 70 is not coincident with that of the zero-point graduation 82a thereof, the deviation in the angle of the horizontal swing of the reflector 4 or that in the angle of the vertical swing of the reflector, namely, the deviation in the angle of the azimuthal direction of emission of light from the headlight or that in the angle of the elevational direction of emission of light therefrom can be detected from the amount of departure from coincidence. In that case, the adjusting screw 20 or the adjusting screw 30 is turned to adjust the headlight so that the position of the zero-point graduation 62a of the first aiming device 50 coincides with that of the reference line 52a thereof, or/and the position of the air bubble 84 of the second aiming device 70 coincides with that of the zero-point graduation 82a thereof. The angle of the azimuthal direction of emission of light from the headlight or/and the angle of the elevational direction of emission of light therefrom can thus be adjusted to be proper.

Figure 10A:
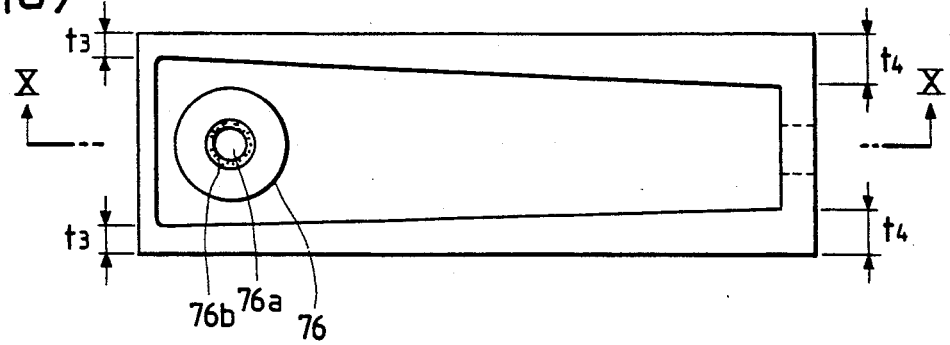
FIG. 10(a) is a plan view of a major part of a modification of the level.
Figure 10B:
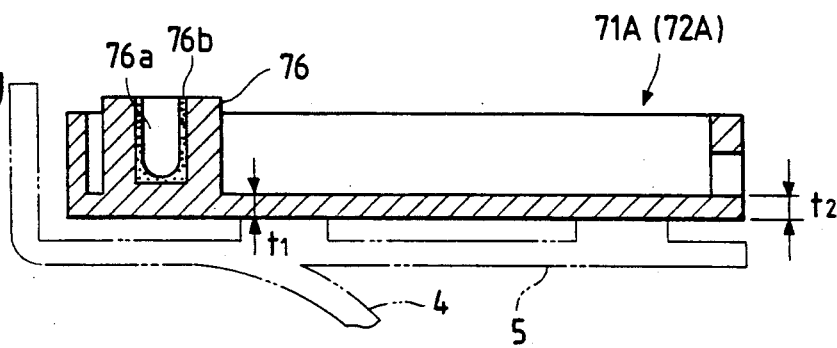
FIG. 10(b) is a sectional view of the modification along a line X—X shown in FIG. 10(a)

FIGS. 9 and 10 shows modifications of the level 70. FIGS. 9(a) and 9(b) show a modification which is a level in which the thickness of a casing body 72A made of aluminum is increased toward the rear end thereof to establish relations $t_1 < t_2$ and $t_3 < t_4$ to thus increase the heat transmitting property of the casing body toward the rear end of the casing 71A of the level. The difference between the quantities of heat transmitted to the respective regions of the casing body 72A is thus further reduced so that the temperature difference of the bubble vial of the level in the longitudinal direction of the vial is decreased.

Figure 11:
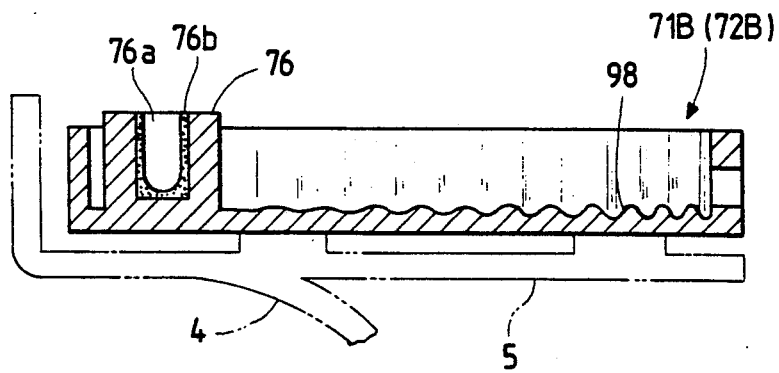
FIG. 11 is a vertical sectional view of a major part of another modification of the level.

FIG. 11 shows a modification which is a level in which the number of the grooves 98 of the inside of a casing body 72B made of aluminum is increased per unit length toward the rear end of the casing body to augment the surface area of the body to boost the heat radiating property of the casing of the level toward the rear end thereof. The difference between the quantities of heat transmitted to the respective regions of the casing body 72B is thus further reduced so that the temperature difference of the bubble vial of the level in the longitudinal direction of the vial is decreased.

Figure 12:
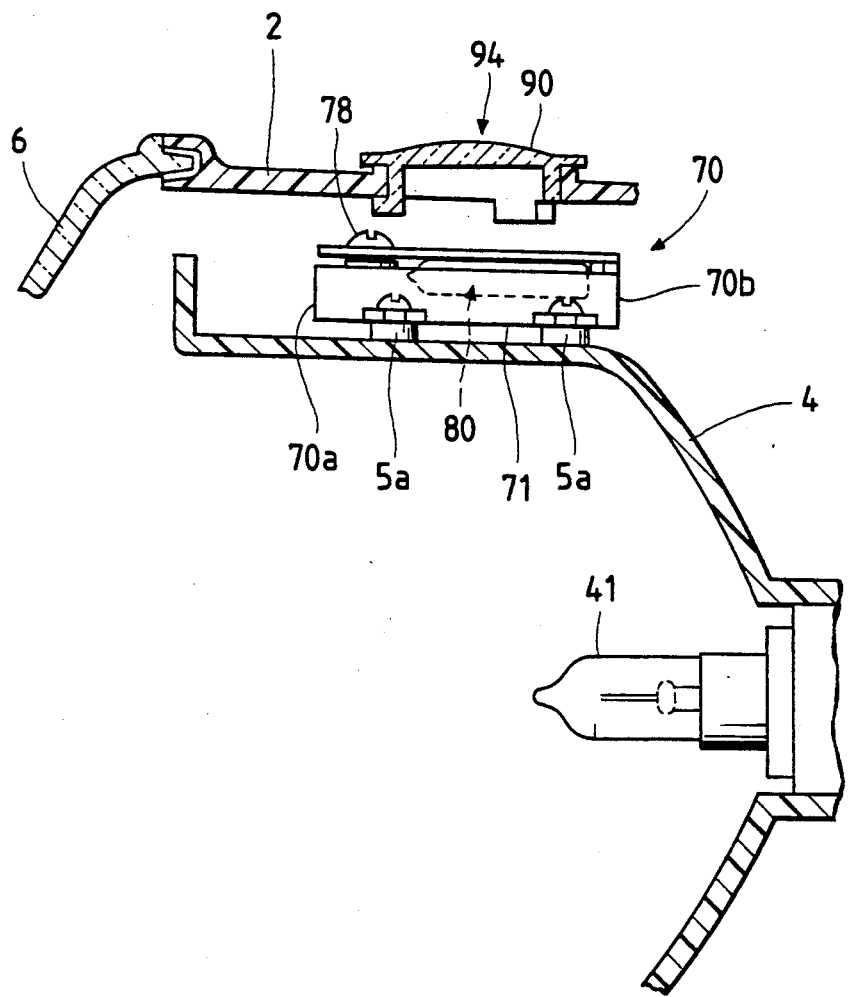
FIG. 12 is a vertical sectional view of a level section, which is a major part of a headlight of another embodiment of the present invention.

In the embodiment described above, the level 70 is attached to the part 5 projecting backward from the body of the reflector 4. However, the present invention is not confined thereto, but may be otherwise embodied so that a level 70 is attached directly to the body of a reflector 4, as shown in FIG. 12. In the embodiment shown in FIG. 12, although the quantity of heat transmitted to the rear end portion 70b of the level 70 is larger than that of heat transmitted to the front end portion 70a of the level located farther from a bulb 41 than the rear end portion, the temperature difference of the level is reduced because the casing 71 thereof is made of aluminum of high thermal conductivity. Moreover, a heat insulating air layer surrounding the bubble vial 80 of the level 70 restricts the transmission of heat to the vial to yet further reduce the temperature difference of the level.

Figure 13:
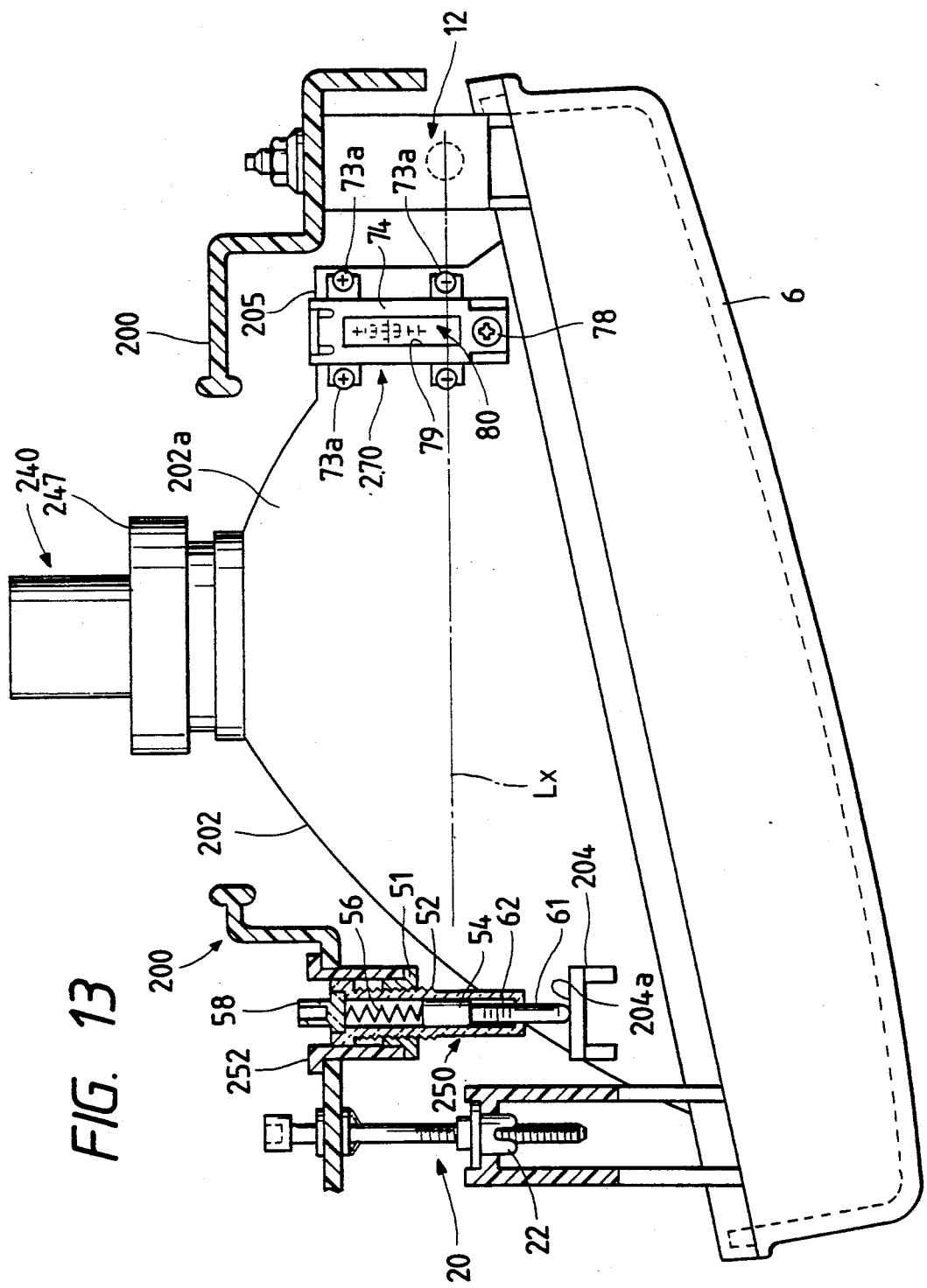
FIG. 13 is a cutaway plan view of a headlight of yet another embodiment of the present invention and which is of the movable unit type; o

FIG. 13 shows a headlight for a motor vehicle constructed according to another embodiment of the invention. The headlight is of the movable unit type in which the headlight body and reflector unit is an aiming device and the headlight housing is a reference member. A first aiming device 250 for measuring the angle of the horizontal swing of the headlight body and reflector unit 202, and a second aiming device 270, which is a level for measuring the angle of the vertical swing of the unit, are provided on the upper portion 202a of the unit, and extend on a horizontal axis $L_x$. The transparent support member 52 of the first aiming device 250 is attached with a holder 252 to the attaching surface of the headlight housing 200. The graduated rod 54 of the device 250 is urged into contact with the vertical part 204 of the upper portion 202a of the body and reflector unit 202. The surface 204a of the vertical part 204 with which the small-diameter portion 61 of the rod 54 contacts is a curved surface, the center of curvature of which is on the horizontal axis $L_x$ so that the rod is not moved by the vertical swing of the unit. The second aiming device 270 is the same in constitution and operation as the level 70 in the preceding embodiment. A bulb socket 204 and a locking cap 247 for securing the socket in a socket hole are provided. The device 270 is secured to the upper portion 202a of the body and reflector unit 202. Otherwise, the headlight is the same as the preceding headlight of the movable reflector type. Equivalents shown in the drawings are denoted by the same reference symbols and are not further described hereinafter.

Although the casings 71, 71A and 71B of the levels in the embodiments described above are made of aluminum, the present invention is not confined thereto, but may be otherwise embodied so that the casings are made of zinc, and iron alloy or a metal of high thermal conductivity, or made of a material high in thermal conductivity and composed of a synthetic resin and a powder of aluminum or the like mixed in the resin to increase the thermal conductivity of the material.

In a headlight for a motor vehicle provided in accordance with the present invention, the angle of the vertical swing of an aiming device (which is a reflector in a movable reflector type headlight or a headlight body and reflector unit in a movable unit type headlight) relative to a reference member (which is the body of the headlight in the movable reflector type and the headlight housing in the movable unit type) is indicated on a level so that the angle of the vertical swing of the aiming device, namely, the angle of the elevational direction of emission of light from the headlight, can be read on the level. To adjust the angle of the elevational direction of emission of light from the headlight, the aiming device is vertically aimed so that the air bubble of the level is set in a prescribed position. For that reason, the angle of the elevational direction of emission of light from the headlight can be easily adjusted.

The temperature around the level changes due to whether the bulb of the headlight is lit or not. The quantities of heat transmitted from the bulb to the regions of the casing of the level differ from each other due to the lengths of the heat transmission passages to the regions. However, since the casing of the level is high in thermal conductivity, the region with the heat transmission passage of greater length eventually receives nearly as much heat as the region with the transmission passage of smaller length, so that the difference between the quantities of heat eventually transmitted to the regions is reduced. For that reason, the difference between the quantities of heat transmitted from the casing to the bubble vial of the level is so little that the temperature of the entire charge of liquid contained in the vial undergoes a nearly uniform change. Therefore, the level does not have the problem that the air bubble in the bubble vial is displaced due to a temperature difference in the liquid in the vial. For that reason, the level obtains a very small measurement inaccuracy due to changes in the ambient temperature around the level so that the angle of the elevational direction of the emission of light from the headlight can be accurately adjusted.

Further, a heat insulating air layer may be formed between the casing and bubble vial of the level to restrict the transmission of heat from the casing to the various regions of the bubble vial and reduce the difference between the quantities of the heat transmitted from the casing to the regions, so that the angle of the elevational direction of emission of light from the headlight can be more accurately adjusted.

The heat transmission passages to the casing of the level can be confined to the bearing parts for the casing so that the quantity of the heat transmitted from the aiming device to the level is decreased to make it possible to lower the heat resisting property of the bubble vial.

Figure 15:
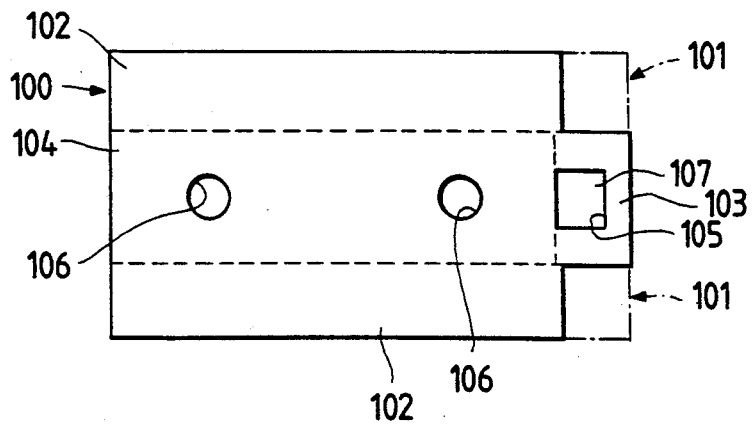
FIG. 15 is an unfolded view of a lining member used in the level of FIG. 14.
Figure 16:
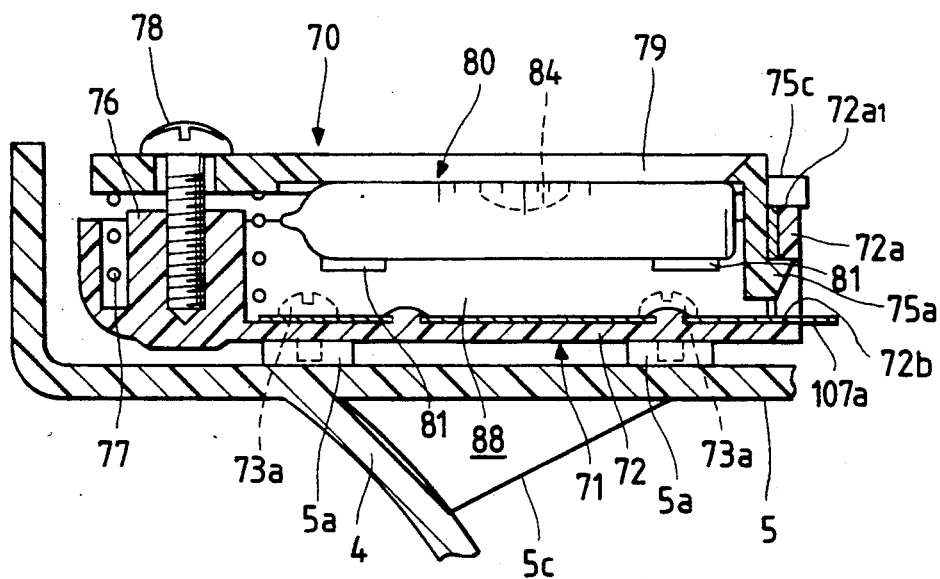
FIG. 16 is an enlarged vertical sectional view of the level.

A further embodiment of the invention will now be described with reference to FIGS. 14-16 in which reference numbers and characters seen commonly in the above-discussed drawings indicate like elements.

Figure 14:
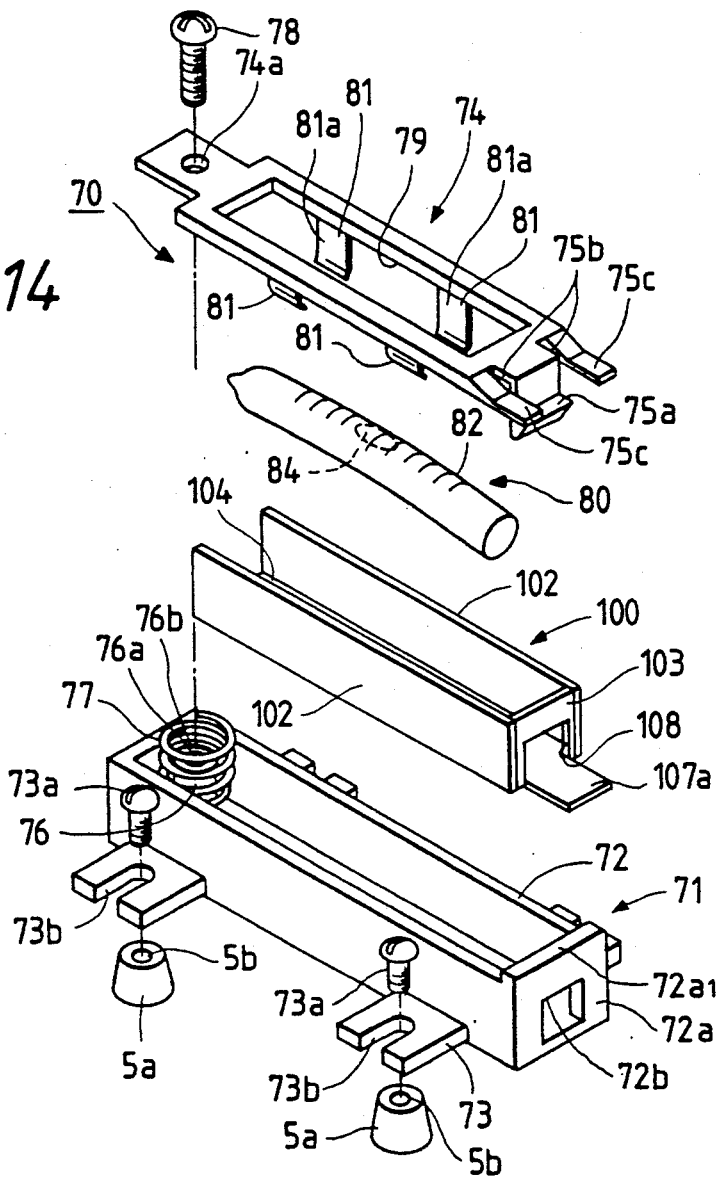
FIG. 14 is a perspective exploded view of a level of another embodiment of the invention.

A lining member 100 shown in FIG. 14 is made of aluminum and provided on the inside surface of a casing body 72, surrounding the bubble vial 80. The lining member 100 is made of a rectangular aluminum plate notched at two corners 101 of the plate and vertically bent up as a frame at portions 102 and 103 corresponding to the side portions and rear wall 72a of the casing body 72, and has holes 106 in a bottom portion 104, as shown in FIG. 15. As shown in FIG. 16, thermally caulked projections on the bottom of the inside of the casing body 72 can extend through the holes 106. A U-shaped slit 105 is made in the portion 103 corresponding to the rear wall 72a of the casing body 72. A part 107 surrounded by the slit 105 is bent relative to another part surrounding the former part, so that an opening 108 equal in size to the opening 72b of the casing body 72 is made in the portion 103, and the part 107 serves as a heat radiation tongue 107a projecting outward from the opening 72b.

When a bulb 41 is lit, heat generated by the bulb is transmitted to the bubble vial 80 through the body and part 5 of the reflector 4 and a level casing 71, all of which have a low thermal conductivity. Since the quantity of heat transmitted from the bulb 41 to the casing body 72 is in inverse proportion to the length of the heat transmission path from the bulb to the casing body, the quantities of heat transmitted from the bulb to the respective regions of the casing body differ from each other. However, the lining member 100 made of aluminum of high thermal conductivity and provided on the inside of the casing body 72 acts to reduce the difference between the quantities of the heat transmitted from the bulb to the respective regions of the casing body.

The lining member 100 of high thermal conductivity transmits nearly as much heat to the region thereof with a heat transmission passage of greater length as to the other region thereof with heat transmission passage of shorter length, so that the difference between the amounts of heating the respective regions of the lining member is reduced. Since the bubble vial 80 is hung with pinchers 81 in the lining member 100 so that a heat insulating air layer 88 is formed between the tube and the lining member, the layer restricts the transmission of the heat to the tube through the lining member and reduces the difference between the quantities of heat transmitted from the lining member to the tube. Thus, the difference between the quantities of heat eventually transmitted to the respective regions of the lining member 100 is reduced, the transmission of heat from the lining member to the bubble vial 80 is restricted by the heat insulating air layer 88, and the difference between the quantities of heat transmitted from the lining member to the bubble vial is reduced by the layer. For these reasons, the distribution of the quantities of the heat transmitted to the respective regions of the bubble vial 80 is made uniform in the longitudinal direction thereof so that the difference between the temperature of the front end portion of the tube and that of the rear end portion thereof is small. As a result, convection is not caused in the bubble vial 80 by the temperature difference, so that the air bubble in the tube is hardly displaced.

The attachment of the level 70 to the reflector 4 will now be described with reference to FIG. 14.

The lining member 100 is first inserted into the casing body 72 so that the thermally caulked projections on the bottom of the inside of the casing body extend through the holes 106 of the lining member. The projections are then thermally caulked so that the lining member 100 is secured to the casing body 72 in tight contact with the inside thereof. The bubble vial 80 is held by the pinchers 81 of the lid 74 of the level 70. The rear end portion of the lid 74 is fitted in the rear wall 73a of the casing 71 by hook and opening engagement. The front end portion of the lid 74 is coupled to a boss 76 by an adjusting screw 78. The lid 74, the casing body 72 and the bubble vial 80 are thus assembled to constitute the level 70. The tongues 73 of the casing 71 are positioned to the bosses 5a of the reflector 4 and then secured to the bosses by screws 73a. After the level 70 is thus attached to the upper portion of the reflector 4, the level is adjusted by the adjusting screw 78 so that when the angle of vertical swing of the reflector, namely, the angle of the elevational direction of emission of light from a headlight is proper, the position of the air bubble 84 of the level is coincident with that of a zero-point graduation 82a, which is one of rectilinear graduations 82.

Figure 17A:
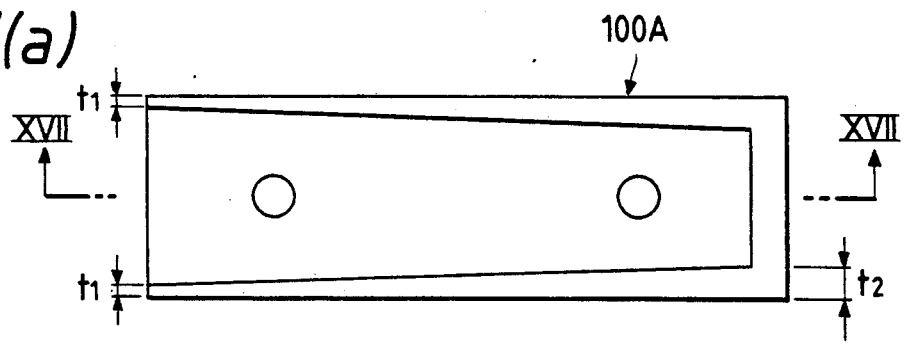
FIGS. 17(a), 17(b) and 18 show arrangements of a lining member formed of aluminum and mounted in the casing of the level.
Figure 17B:
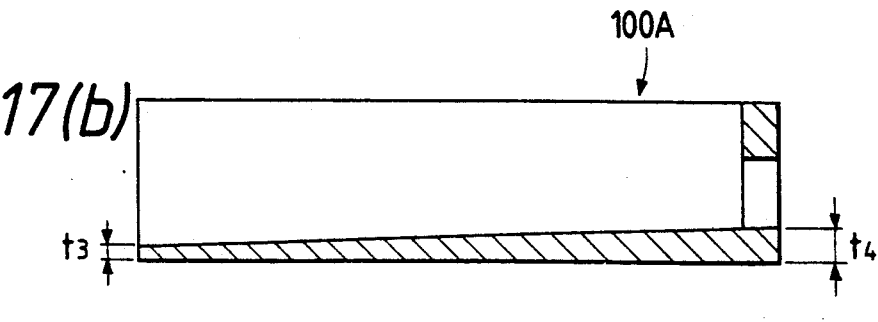
Figure 18:
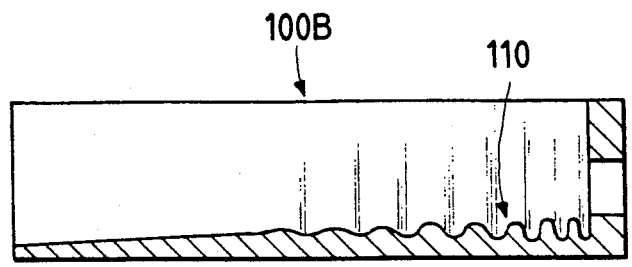

FIGS. 17(a), 17(b) and 18 show arrangements of the lining member formed of aluminum and mounted in the casing of the level. The thickness of the lining member 100A shown in FIGS. 17(a) and 17(b) increases toward the rear end thereof to established relations $t_1 < t_2$ and $t_3 < t_4$ to thus increase the heat transmitting property thereof toward the rear end of the level. The difference in the amount of heat transmitted to the respective regions of the lining member 100A is thus further reduced so that the temperature difference of the bubble vial of the level in the longitudinal direction of the tube is further decreased.

A lining member 100B shown in FIG. 18 is formed of diecast aluminum. The number of grooves formed on the inner surface of the lining member 100B increases toward the rear end of the lining member and, accordingly, the area surface increases toward the rear end of the lining member 100B, thereby further reducing the difference in the amount of heat transmitted to the respective regions of the lining member 100B so that the temperature difference of the bubble vial of the level in the longitudinal direction of the tube is further decreased.

Figure 19:
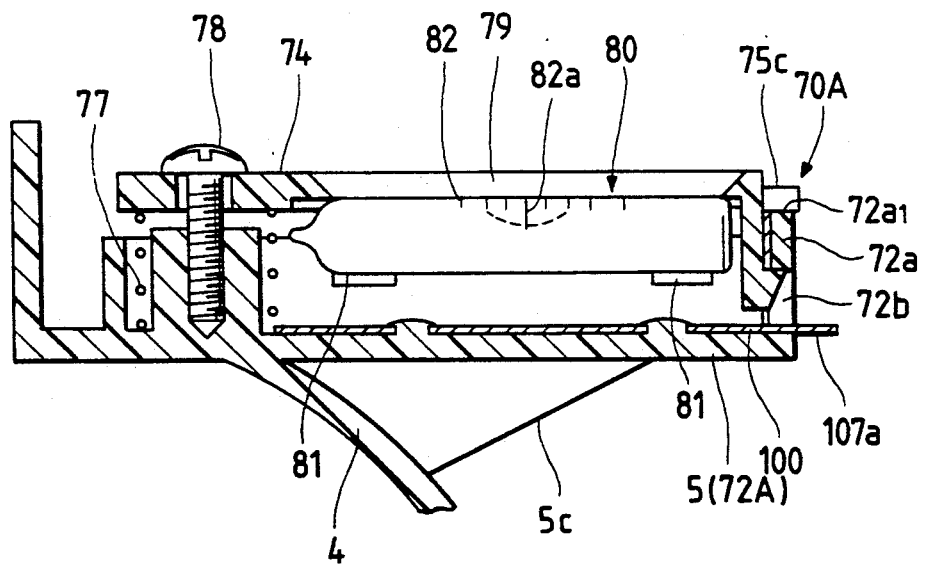
FIG. 19 shows another embodiment of a level of the present invention.

FIG. 19 shows another embodiment of the present invention in which the casing body 72A of the level is unitarily formed with the reflector 4 positioned on the upper wall of the reflector 4, and the outwardly extending part 5 is unitarily formed with the casing body 72A.

According to this embodiment, the level 70A can be mounted on the reflector 4 only by mounting the bubble vial 80 on the casing body 72A. The other parts or components of this embodiment are the same as that of the aforedescribed embodiment.

Figure 20:
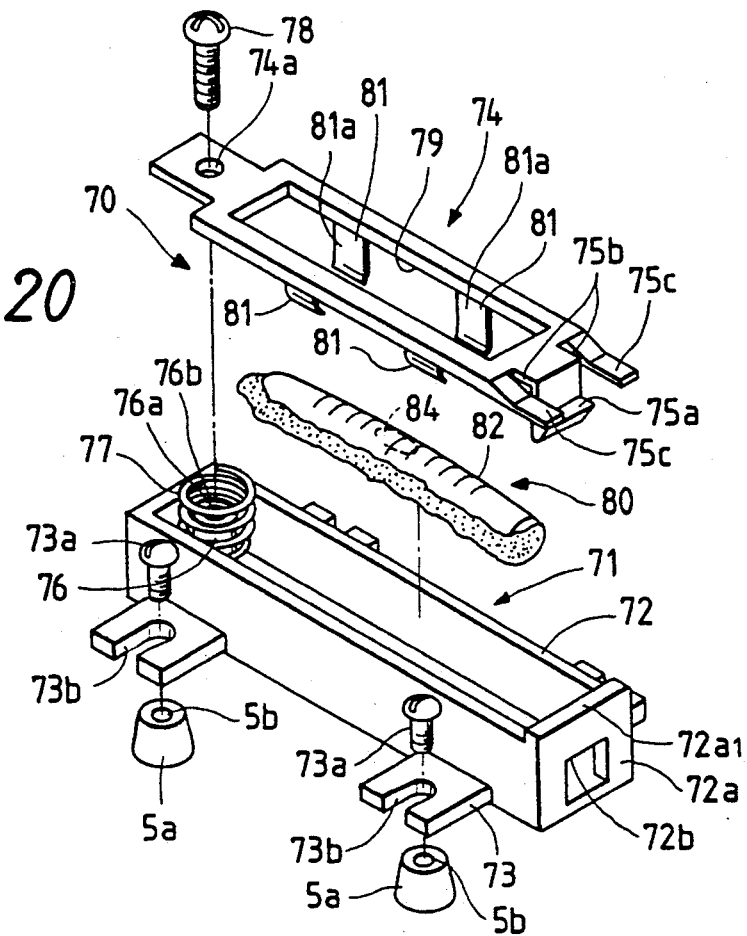
FIG. 20 is a perspective exploded view of a level of yet another embodiment of the invention.
Figure 21:
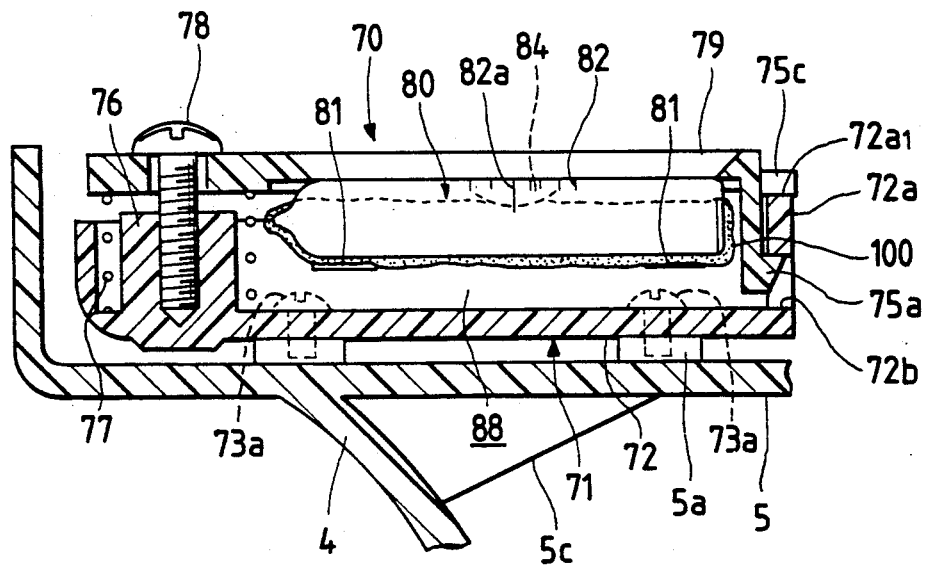
FIG. 21 is an enlarged vertical sectional view of the level of FIG. 20.

Referring now to FIGS. 20 and 21, a yet further embodiment of the invention will be described.

As shown in FIGS. 20 and 21, the outside circumferential surface of an air bubble vial 80, excluding the graduated part of the surface, is coated with a heat radiating grease 100 obtained by blending a silicone oil with a high-thermalconductivity powder such as a fine powder of silica. For example, the grease may be an oil compound produced by Shinetsu Chemical industry Co., Ltd., and sold under the trade designation KS609 or KS612, or a heat radiation silicone produced by Sanhatoya Co., Ltd.

When the bulb 41 is lit, heat generated by the bulb is transmitted to the bubble vial 80 through the body and part 5 of the reflector and a level casing 71, which are low in thermal conductivity. Since the quantity of heat transmitted from the bulb 41 to the casing body 71 is in inverse proportion to the length of the heat transmission path from the bulb to the casing body, the quantities of the heat transmitted from the bulb to the respective regions of the casing body differ from each other. However, since the bubble vial 80 is hung with pinchers 81 in the casing body 72 so that a heat insulating air layer 88 is formed between the tube and the casing body, the layer restricts the transmission of heat from the casing body to the tube and reduces the difference between the quantities of heat transmitted from the casing body to the respective regions of the tube.

The heat radiating grease 100 provided on the outside circumferential surface of the bubble vial 80 and high in thermal conductivity and heat radiating properties also reduces the difference between the quantities of heat transmitted to the respective regions of the bubble vial 80. In other words, the heat radiating grease 100 reduces the difference between the quantities of heat transmitted to the respective regions of the grease through the heat insulating air layer 88 and the grease itself, and transmits the heat to the respective regions of the bubble vial 80. Since the heat radiating grease 100 high in heat transfer coefficient transmits nearly as much heat to the region with a heat transmission path of smaller length, the difference between the quantities of heat transmitted to the respective regions of the bubble vial 80 is reduced. For this reason, the distribution of the quantities of heat transmitted to the bubble vial 80 is made uniform in the longitudinal direction thereof so that the difference between the temperature of the front end portion of the tube and that of the rear end portion thereof is small. As a result, convection is not caused in the bubble vial 80 by a temperature difference, so that the air bubble in the vial is hardly displaced.

The attachment of the level 70 to the reflector 4 will now be described with reference to FIG. 20.

The bubble vial 80 is first held by the pinchers 81 so that the tube is coupled to the lid 74 of the level 70. The whole outside circumferential surface of the bubble vial 80 except the graduated part of the surface is then coated with a sufficient quantity of the heat radiating grease 100. The rear end portion of the lid 74 is fitted in the rear wall 72a of the casing 71 of the level 70 by hook and opening engagement. The front end portion of the lid 74 is coupled to a boss 76 by an adjusting screw 78. The lid 74, the bubble vial 80 and the casing 71 are thus assembled to constitute the level 70. The tongues 73 of the casing 71 are positioned to the bosses 5a of the reflector 4 and secured to the bosses by screws 73a.

After the level 70 is thus attached to the upper portion of the reflector 4, the level is adjusted by the adjusting screw 78 so that when the angle of the vertical swing of the reflector, namely, the angle of the direction of emission of light from a headlight is proper, the position of the air bubble 84 of the level is coincident with that of a zero-point graduation 82a, which is one of the rectilinear graduations 82.

Still further embodiments of the invention will be described with regard to FIGS. 22-25.

The portion of the body of the headlight of the movable reflector type which corresponds to the level has an opening for reading the graduations of the level and for performing the zero point adjustment thereof. A vertical screw turning tool can be inserted into the opening to turn the first vertical screw or/and the second vertical screw to perform the zero point adjustment of the level.

With reference to FIGS. 22-25, tongues 73 are borne on bosses 4C so that a level casing 71 is located over an outwardly extending part 4B with a gap S between them. The gap S acts so that heat generated by a lit bulb 41 is less likely to be transmitted to the level casing 71 through the reflector. As a result, the rise in the temperature of an bubble vial 80 due to the heat of the bulb is restricted. Since the casing 71 is made of aluminum high in heat transfer coefficient, heat is uniformly transmitted from the bosses 4C to the whole casing so that heat is also uniformly transmitted to the bubble vial 80 in the casing. Since the bubble vial 80 is hung in the body 72 of the casing 71 so that a heat insulating air layer $S_1$ is formed around the tube, the quantity of heat transmitted to the tube is further reduced and the distribution of the quantities of heat transmitted to the respective regions of the tube is made more uniform. This results in avoiding the problem that a temperature difference causes convection in the liquid contained in the bubble vial 80, making it impossible to perform accurate measurement with the level 70. The lid 74, which acts as the bubble vial holder at the inside of which the bubble vial 80 is attached, is secured to the casing body 72 on the open top thereof. The lid 74 is made of a high-elasticity synthetic resin such as U polymer and polyacetal, and has an opening 79 in the central portion of the lid. The graduated surface of the tube 80 is exposed in the opening 79. The lid 74 is a fitted at a portion thereof in the casing body 72 by hook and opening engagement, and coupled at another portion of the lid to the casing body by a first vertical screw 78 for the zero point adjustment of the level 70. The lid is located on the top of the casing body. The rear wall 72a of the casing body 72 has a rectangular opening 72b. The rear end portion of the lid 74 has a hook 75a vertically projecting down and fitted in the opening 72b of the casing body 72. The rear end portion of the lid 74 has a pair of engagement parts 75c extending at both the sides of the hook 75a. When the hook 75 is fitted in the opening 72b while the engagement parts 75c are borne on the top 72a₂ of the rear wall of the casing body 72 and the top projection 72a₁ of the rear wall is interposed between the engagement parts, the hook and the engagement parts are elastically deformed in mutually opposite directions as cantilevers so that the rear end portion of the lid is prevented from vertically coming off the casing body and is elastically supported vertically. Thus, a hook and opening elastic engagement arrangement for elastically supporting the lid 74 at the rear end portion thereof to prevent it from coming off the casing body 72 is constituted by the opening 72b of the casing body and the hook 75a and engagement parts 75c of the lid.

Figure 24:
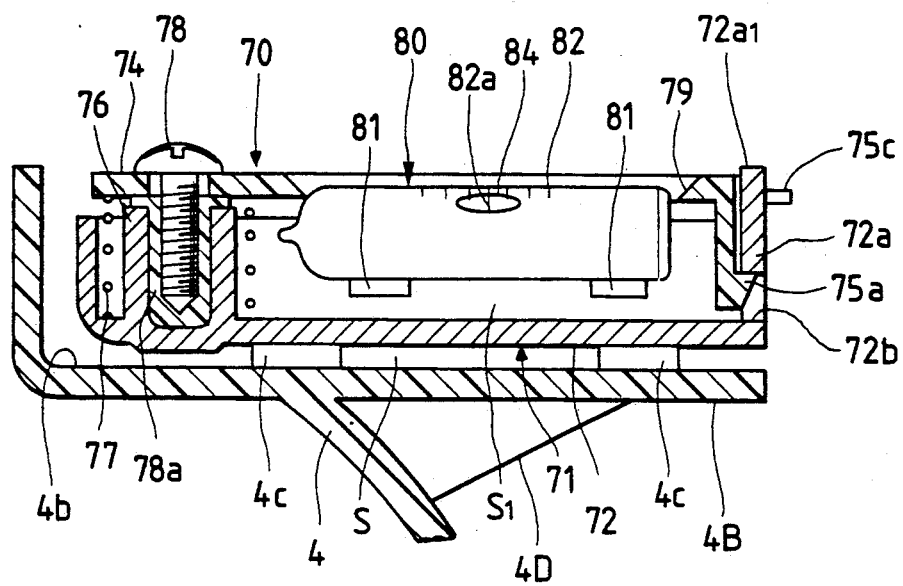

The front end portion of the lid 74 has a screw insertion hole 74a. A boss 76 is provided on the front portion of the bottom of the inside of the casing body 72, and has a tapped hole 76a. A compressed helical spring 77 is provided around the boss 76. The front end portion of the lid 74 is coupled to the boss 76 by the first vertical screw 78 for the zero point adjustment of the level 70 so that the lid is elastically supported vertically at the front end portion thereof by the casing body 72. The driven quantity of the vertical screw 78 can be set to adjust the angle of the swing of the lid 74, namely, the angle of the swing of the bubble vial 80 or the posture thereof. The zero point adjustment of the level 70 can thus be performed. A first zero point adjustment mechanism for adjusting the angle of the swing of the bubble vial 80 is composed of the hook and opening elastic engagement means for supporting the lid 74 at the front end portion thereof, and the compressed helical spring 77 and the first vertical screw 78 which support the lid at the front end portion thereof. Shown at 78a in FIG. 24 is a rubber member fixed to the inside circumferential surface of the boss 76 in the vertical screw engagement hole thereof so as to prevent electrolytic corrosion of the ferrous vertical screw 78 and the aluminum boss 76.

The lid 74 has a sideward extending portion 174 projecting from one side edge of the lid and a screw insertion hole 174a. The casing body 72 has a boss 176 having a tapped hole 176a and located in a position corresponding to that of the sideward extending portion 174 of the lid 74. One side wall of the casing body 72 has a notch 173 from which the sideward extending bottom portion 172 of the casing body extends. The boss 176 is formed on the sideward extending bottom portion 172 of the casing body 72. A compressed helical spring 177 is provided around the boss 176. The sideward extending portion 174 of the lid 74 and the boss 176 of the casing body 72 are coupled to each other by a second vertical screw 178 for the zero point adjustment of the level 70 so that the lid is elastically supported vertically at the sideward extending portion thereof by the casing body. The driven quantity of the second vertical screw 178 can be set to perform the zero point adjustment of the level 70. A second zero point adjustment mechanism is composed of the compressed helical spring 177 and the second vertical screw 178. The zero point adjustment of o the level 70 can be performed by either of the first and the second vertical screws 78 and 178.

A pair of the vertical projections 92 extend down from the other side edge of the lid 74 opposite the sideward extending portion 174 thereof. A slide guide 194 projects from the outside of the other side wall of the casing body 72 so that the vertical projections 92 of the lid 74 are fitted on the slide guide and vertically extend relative thereto. The vertical projections 92 and the slide guide 194 function as guide parts for the swing of the lid 74 in the zero point adjustment of the level 70 by the second vertical screw 178. Since the second vertical screw 178 is provided at the side edge of the lid 74, a torsional moment acts on the lid due to the turning of the screw so that the lid would be likely to be contorted into a twisted state. For that reason, an aiming guide, composed of the vertical projections 92 of the lid 74 and the slide guide 194 of the casing body 72, is provided opposite the second vertical screw 178 at which the force for the turning thereof acts to the lid. As a result, the lid 74 can be swung without being twisted.

Figure 23:
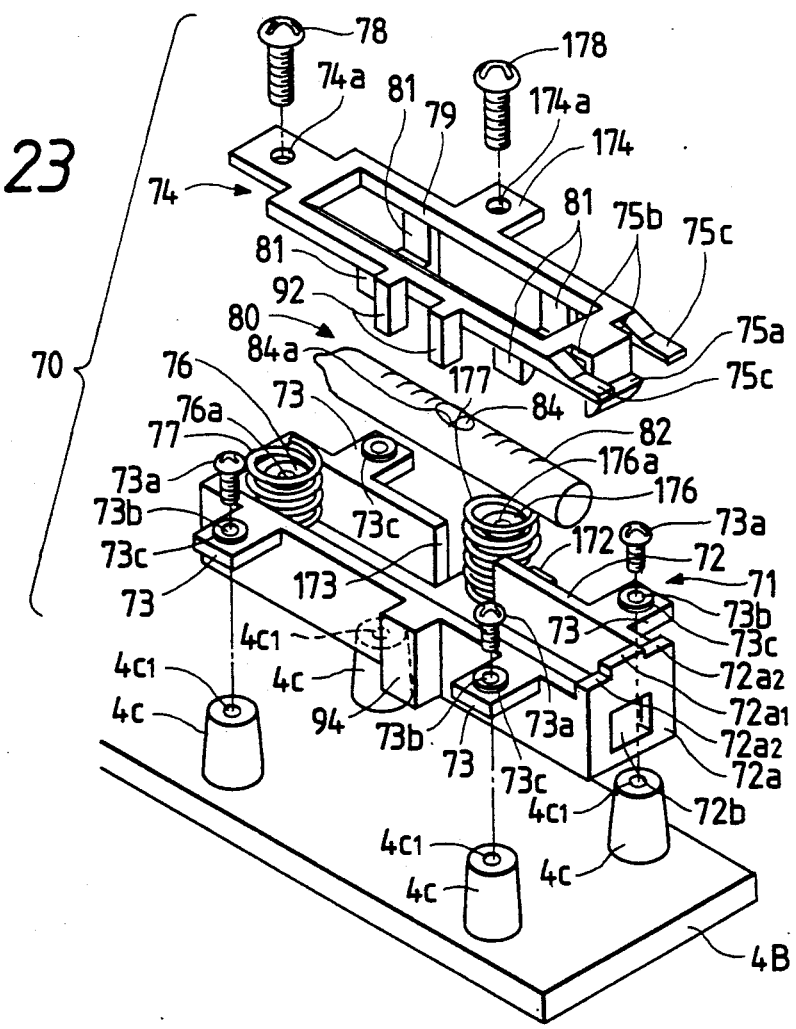
Figure 25:
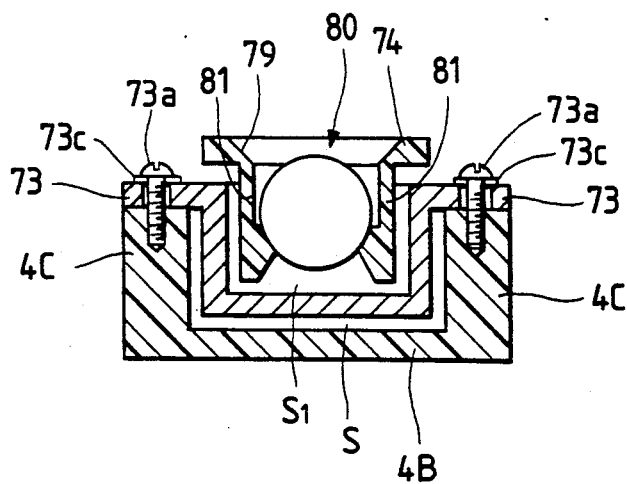
FIG. 25 is a cross-sectional view taken along a line XXV—XXV in FIG. 22.

The central portion of the lid 74 has an oblong opening 79 in the central portion of the lid. Pinchers 81 project from the inside of the lid 74 at the peripheral edges of the opening 79. The bubble vial 80 is pinch-held by the pinchers 81 as shown in FIG. 25. The surface of the bubble vial 80, which has graduations 82, is exposed in the opening 79. An air bubble 84 is contained in the vial 80. Shown at 82a is a zero-point graduation, which is one of the graduations 82. The vial 80 is hung with the pinchers 81 in the casing body 72 so that the heat insulating air layer $S_1$ is formed between the vial and the casing body to make heat less likely to be transmitted from the casing 71 of the level 70 to the vial. Since the lid 74 is supported at the rear end portion thereof on the top 72a, of the rear wall of the casing body 72, which is located higher than the side walls of the casing body, as shown in FIG. 23, and the lid 74 is elastically supported at the front end portion thereof by the compressed helical spring 77 and the vertical screw 78, a gap is formed between the lid and the casing body so that the interior of the casing 71 communicates with the exterior thereof through the gap, the opening 72b of the rear wall 72a of the casing body and the notch 173 of the side wall thereof. As a result, air is allowed to freely flow into and out of the heat insulating layer $S_1$ to avoid a problem that heat is accumulated in the layer to adversely affect the bubble vial 80.

Figure 22:
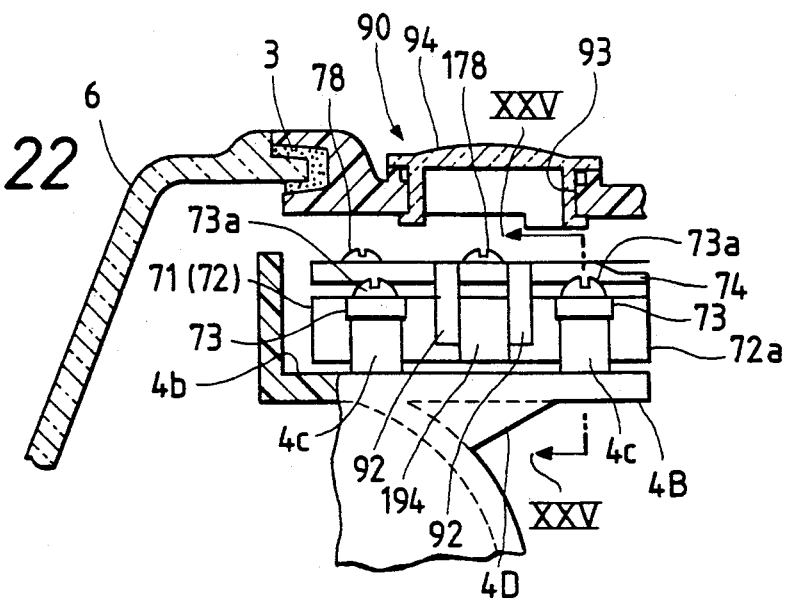
FIGS. 22-24 are views similar to FIGS. 7-9, respectively, depicting a still further embodiment of the invention.

As shown in FIG. 22, the portion of the body 2 of a headlight, which corresponds to the level 70, has an observation window 94 for reading the graduations of the level. The diameter of the window 94 is smaller that the total length of the level 70. The window 94 is constituted by the opening 93 of the headlight body 2 and a transparent cap 90 fitted in the opening so that the cap can be removed therefrom in order to insert a screwdriver into the opening to turn the vertical screw 78 or 178.

The attachment of the level 70 to the reflector 4 will now be described with reference to FIG. 23.

The bubble vial 80 is first inserted between the pinchers 81 from the lower edge thereof so that the vial is supported by the lid 74. The lid 74 is then fitted at the rear end portion thereof in the rear wall 72a of the casing 71 by the hook and opening engagement, and coupled at the front end portion and sideward extending portion of the lid to the bosses 76 and 176 by the vertical screws 78 and 178, so that the bubble vial 80, the lid and the casing are assembled to constitute the level 70. The tongues 73 of the casing 71 are positioned to the bosses 4C of the reflector 4 and secured to the bosses by screws 73a. After the level 70 is thus attached to the upper portion of the reflector 4, the level is adjusted by the vertical screws 78 and 178 so that when the angle of the vertical swing of the reflector, namely, the vertical angle of the optical axis 1 of the headlight is proper, the position of the air bubble 84 of the level coincides with that of the zeropoint graduation 82a, which is one of the rectilinear graduations 82 of the level. The adjustment of the level 70 by the vertical screw 78 is primary, while that of the level by the other vertical screw 178 is secondary. The vertical screw 178 is left loose to such an extent as not to hinder the adjustment of the level 70 by the other vertical screw 78. The reflector 4 fitted with the level 70 thus adjusted in connection with the angle of the swing of the reflector is attached to the body of the headlight so that the reflector and the body constitute the headlight.

The procedure of adjusting a first and a second aiming devices 50 and 70 after attaching the headlight to the body of a motor vehicle, and the procedure of adjusting the angle of the direction of the emission of the light from the headlight after the adjustment of the measuring devices will now be described.

The headlight is designed such that the angle of the azimuthal direction of the emission of the light from the headlight before the headlight is attached to the body of the vehicle is proper when the position of the zero-point graduation of the first aiming device 50 is coincident with that of the reference line 52a, and that the angle of the elevational direction of the emission of the light from the headlight is proper when the position of the air bubble 84 of the level 70, which is the second aiming device, is coincident with that of the zero-point graduation 82a, which is one of the rectilinear graduations 82. When the headlight having the first and the second aiming devices 50 and 70 is attached to the body of the vehicle, the graduations of the devices usually are not at their proper positions due to various dimensional inaccuracies or the like. The graduations of the measuring devices 50 and 70 thus generally need to be adjusted into the proper positions.

An example of a process of adjusting the graduations of the first aiming device 50 into the proper positions will now be described.

The motor vehicle is moved onto a horizontal surface. A light screen is set in a prescribed position in front of the vehicle. The headlight is lit. The aiming screw 20 of the device 50 is turned to adjust the device so that the spot of the light from the headlight is set in a prescribed position on the screen in the horizontal direction thereof, i.e., the optical axis 1 of the headlight is coincident with the axis of the vehicle. At that time, however, the position of the reference line 52a of the device 50 and that of the zero-point graduation of the device usually do not coincide with each other due to dimensional inaccuracies of the headlight attachment surface of the body of the vehicle. In that case, the zero point adjustment screw 58 of the device 50 is turned to move the slide case 56 backward or forward in the axial direction thereof to make the position of the zero-point graduation of the device with that of the reference line 52a thereof. The device 50 is thus adjusted so that the graduation whose position is coincident with that of the reference line 52a indicates the zero point of the device when the angle of the azimuthal direction of the emission of the light from the headlight is proper.

An example of a process of adjusting the graduations of the second aiming device 70 to the proper positions will now be described. The aiming screw 30 of the device 70 is turned to adjust the device so that the spot of the light from the headlight is set in a prescribed position on the light screen in the vertical direction thereof. At that time, however, the position of the air bubble 84 of the device 70 usually does not coincide with that of the zero-point graduation 82a thereof due to dimensional inaccuracies of the headlight attachment surface of the body of the vehicle or the like. In that case, a screwdriver is inserted into the opening 93 of the body of the headlight to turn the first vertical screw 78 to adjust the device 70 so that the position of the air bubble 84 coincides with that of the zero-point graduation 82a. At that time, if it is not easy to turn the first vertical screw 78, the second vertical screw 178 is turned to adjust the device 70 so that the position of the air bubble coincides with that of the zero-point graduation. The level 70 is thus adjusted so that the air bubble 84 indicates the zero-point graduation 82a when the angle of the elevational direction of the emission of the light from the headlight is proper. Because of the positional relationship between the opining 93 of the body of the headlight and the first vertical screw 78, it is likely to be difficult to turn the screw with screwdriver inserted into the opening. For that reason, the second vertical screw 178 should usually be turned to swing the lid 74 to perform the zero point adjustment of the level 70.

After the above adjustment, the angle of the direction of the emission of the light from the headlight is adjusted if necessary. When it is observed by looking downward from over the rear portion of the headlight that the position of the reference line 52a of the first aiming device 50 is not coincident with that of the zero-point graduation thereof or/and the position of the air bubble 84 of the second aiming device 70 is not coincident with that of the zero-point graduation 82a thereof, the deviation in the angle of the horizontal swing of the reflector 4 or/and that in the angle of the azimuthal direction of the emission of the light from the headlight or/and that in the angle of the elevational direction of the emission of the light from the headlight can be detected from the amount of non-coincidence. In that case, the aiming screw 20 or/and the aiming screw 30 are turned to adjust the headlight so that the position of the zero-point graduation of the first aiming device 50 coincides with that of the reference line 52a thereof or/and the position of the air bubble 84 of the second aiming device 70 coincides with that of the zero-point graduation 82a thereof The angle of the direction of emission of the light from the headlight can thus be adjusted to be proper.

Figure 26:
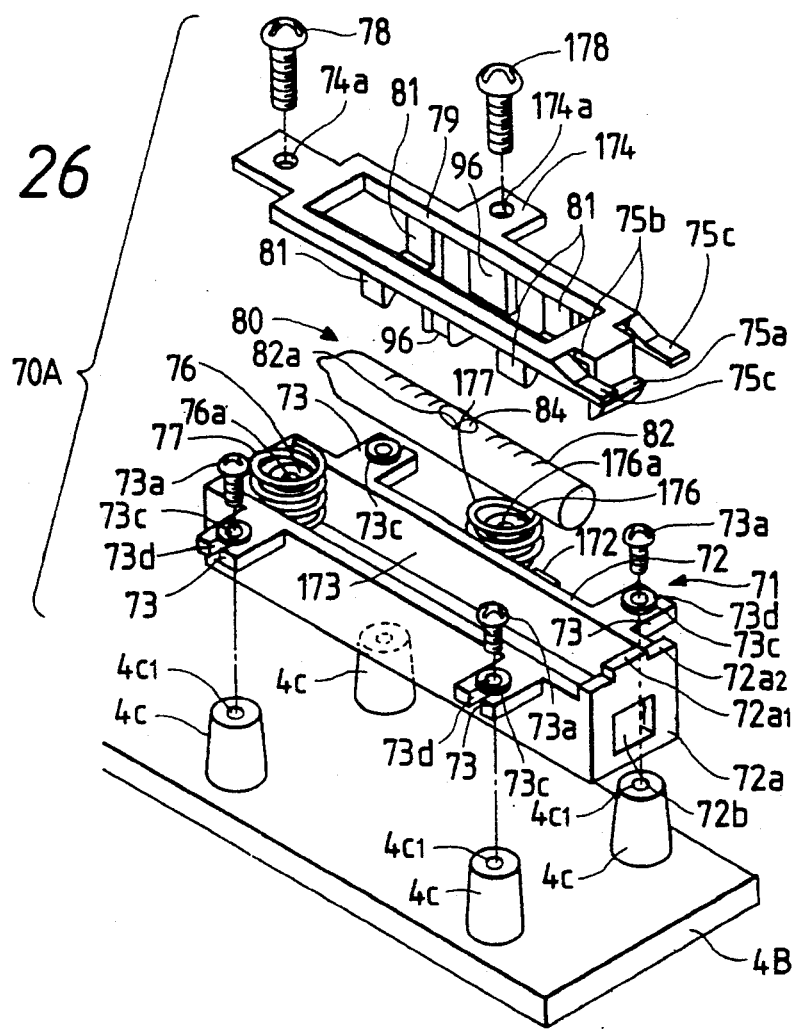
FIGS. 26 is an exploded view of a still further embodiment of the invention.
Figure 27:
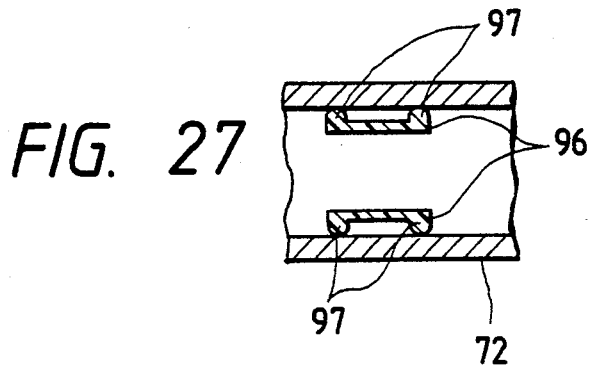
FIG. 27 is a horizontal sectional view of an aiming guide for the lid of the level of FIG. 26.

FIGS. 26 and 27 show major parts of a headlight of still another embodiment of the present invention. FIG. 26 is a perspective exploded view of a level which is a device for measuring the angle of the elevational direction of emission of light from the headlight. FIG. 27 is a horizontal sectional view of an aiming guide for the lid of the level. Shown at 70A in FIGS. 26 and 27 is a level differing in the constitution of the aiming guide from the level 70 of the preceding embodiment. The level 70A has a pair of vertical projections 96 formed at both the side edges of the opening 79 of the lid 74 of the level and located in positions corresponding to that of a second vertical screw 178 provided at the side edge of the opening. The vertical projections 96 are engaged with the insides of the side walls of the body 72 of the casing of the level 70A so that the lid 74 can be swung about a hook and opening engagement structure for the rear end portion of the lid and the rear wall of the casing, without being twisted, by turning the second vertical screw 178. Shown at 97 in FIG. 26 are vertical ribs formed on the outsides of the vertical projections 96 and having arc-shaped horizontal cross sections. The tongues 73 of the casing have two-split screw-fitting tip portions 73d provided with rubber washers 73c. The diameter of an observation window 94 provided in the body 2 of the headlight is larger than the total length of the level 70A as well as the preceding level 70. As a result, although it is not easy to turn the first vertical screw 78 with a tool inserted into the opening 93 of the headlight body 2, it is easy to turn the second vertical screw 178 with the tool inserted into the opening to perform the zero point adjustment of the level 70A.

What is claimed is:

1. A headlight for a motor vehicle of a movable reflector type in which a reflector fitted with a bulb therein can be swung vertically and horizontally in a body of said headlight so as to adjust the angle of the direction of emission of light from said headlight, the improvement comprising a level for measuring the angle of the elevational direction of said emission attached in a prescribed position to said reflector, said level comprising a casing shaped as a rectangular container and open at the top of said casing, a holder positioned over said top of said casing, a rectilinear bubble vial suspended from a lid of said holder and housed in said casing, and a zero point adjustment mechanism provided in such a manner that one longitudinal end portion of said holder in the longitudinal direction of said vial is fitted in said casing by a hook and opening engagement means so as to vertically support said holder, one side portion of said holder being fitted to a vertical screw engaged in a tapped hole of said casing and vertically extending through said holder so as to be used for the zero point adjustment of said level, a compressed spring provided between said holder and said casing and urging said holder toward the head of said screw so as to elastically support said holder, said holder being swung about said means by turning said vertical screw.

2. The headlight according to claim 1, further comprising a transparent member forming an observation window for reading graduations of said vial removably fitted in an opening in said body of said headlight.

3. The headlight according to claim 1, wherein said holder comprises a pair of vertical projections extending downward from opposed side edges of said holder.

4. The headlight according to claim 3, wherein each of said vertical projections comprises a pair of vertical ribs formed on outside surfaces thereon.

5. The headlight according to claim 4, wherein each of said vertical ribs has an arc shape in cross section.

6. The headlight according to claim 5, wherein said casing comprises a main body having the shape of a rectangular container, and a plurality of tongue portions extending sidewards from said main body, a plurality of bosses extending from a body of a reflector and projecting therefrom, screws for attaching said tongue portions of said casing to said bosses, and a rubber washer provided around a fitting tip portion of each of said screws in said tongue portions.

7. The headlight according to claim 1, further comprising a second zero point adjustment mechanism provided between said screw and said means and comprising a second vertical screw engaged in another tapped hole of said casing and vertically extending through said holder, a second compressed spring provided between said holder and said casing and elastically supporting said holder, a portion of the body of said headlight corresponding to said level having an opening into which a tool for turning said screws can be inserted for adjusting said screws.

8. The headlight according to claim 7, wherein said holder comprises a pair of vertical projections extending downward from a side edge of said holder opposite said first vertical screw, and said casing comprises a slide guide, said vertical projections being slidably fitted on said slide guide.

* * * * *